US 8,816,976 B2

(12) United States Patent
Bhattacharjee

(10) Patent No.: US 8,816,976 B2
(45) Date of Patent: Aug. 26, 2014

(54) SYSTEMS AND METHODS FOR TEXT INPUT FOR TOUCH-TYPABLE DEVICES

(75) Inventor: Abijit Bhattacharjee, Noida (IN)

(73) Assignee: Luna Ergonomics Pvt. Ltd., Noida (IN)

( * ) Notice: Subject to any disclaimer, the term of this patent is extended or adjusted under 35 U.S.C. 154(b) by 564 days.

(21) Appl. No.: 13/140,803

(22) PCT Filed: Dec. 10, 2009

(86) PCT No.: PCT/IN2009/000715
§ 371 (c)(1),
(2), (4) Date: Jun. 17, 2011

(87) PCT Pub. No.: WO2010/082218
PCT Pub. Date: Jul. 22, 2010

(65) Prior Publication Data
US 2011/0248924 A1    Oct. 13, 2011

(30) Foreign Application Priority Data
Dec. 19, 2008  (IN) ............................ 2873/DEL/2008

(51) Int. Cl.
*G09G 5/00*   (2006.01)
(52) U.S. Cl.
USPC ......................................... 345/173; 345/169
(58) Field of Classification Search
USPC .................................................. 345/168–174
See application file for complete search history.

(56) References Cited

U.S. PATENT DOCUMENTS

| 6,307,549 | B1 | 10/2001 | King |
| 2004/0122979 | A1* | 6/2004 | Kirkland |
| 2004/0201576 | A1* | 10/2004 | Shimada et al. ............... 345/173 |
| 2007/0046641 | A1* | 3/2007 | Lim ............................... 345/173 |
| 2007/0216659 | A1* | 9/2007 | Amineh ......................... 345/173 |

FOREIGN PATENT DOCUMENTS

| DE | 102007008434 A1 | 8/2008 |
| WO | 01/75580 A2 | 10/2001 |
| WO | 2004/051392 A2 | 6/2004 |

OTHER PUBLICATIONS

International Search Report, PCT/IN2009/000715, dated Apr. 15, 2011.

* cited by examiner

*Primary Examiner* — Regina Liang
(74) *Attorney, Agent, or Firm* — Nixon Peabody LLP

(57) ABSTRACT

Described systems and mechanisms relate to techniques for improving usability, speed, and accuracy of text input to touch-typable devices. A touch-typable device can include a movable keymask comprising of a plurality of cells mapped with one or more keys of text input keypad of the touch-typable device, wherein each of the plurality of cells of the movable keymask superimposes over textual input choices enabling the user to select the desired textual input from the plurality of cells of the movable keymask using the text input keypad of the touch-typable device. The textual input choices can be chosen after every user input from a set of likely input choices, wherein the likely input choices can be selected based on previous textual input sequence, phoneme and syllabary patterns, statistical correlation between the previous textual input sequence and set of textual input choices, dictionary lookups, and usage patterns of said user.

18 Claims, 16 Drawing Sheets

SYSTEMS AND METHODS FOR TEXT INPUT FOR TOUCH-TYPABLE DEVICES

CROSS REFERENCE TO RELATED APPLICATIONS OR PRIORITY CLAIM

This application is a National Phase of PCT/IN2009/000715, filed Dec. 10, 2009, entitled, "SYSTEMS AND METHODS FOR TEXT INPUT FOR TOUCH-TYPABLE", and which claims priority of, Indian Patent Application 2873/DEL/2008, filed Dec. 19, 2008, the contents of which are incorporated herein by reference in their entirety.

FIELD OF INVENTION

The invention relates to systems and methods for text input for touch-typable devices. In particular, the present invention relates to systems and methods for entering text input in touch-typable devices such as mobile phones using an unambiguous keypad typing scheme for faster typing on limited keypads using a movable keymask and an optimized dynamic key assignment.

BACKGROUND OF THE INVENTION

In the modern world, hand-held communication devices such as mobile phones, personal handyphone system (PHS), car phones, and pocket beepers have become an integral part of people's lives and prominent media of communication. Hand-held communication devices provide multiple modes through which the parties can communicate with each other. Such modes include two-way communication modes such as direct voice conversation between the parties over the phone and one-way communication modes such as Short Message Service (SMS).

Hand-held devices typically have limited textual input options due to their small sizes, which can support only small keyboards having limited number of keys. For instance, a basic model of a mobile phone has 21 keys, wherein 12 keys are present for entering text inputs (present in the form of a 3*4 matrix), 2 keys are used for communication functionality (Red and Green buttons), 3 keys are used for selection options, and 4 keys (Up, Down, Left, Right) are used for navigation purposes. These small set of keys are expected to support large alphabet sets in one or more languages for applications such as text messaging. For instance, while typing a text message (a SMS), a number of characters in multiple forms such as in upper and lower cases, numbers and special characters, symbols, and other options are needed. If we take the case of English, it is common to see a set of characters of the English alphabet printed on each of the keys. Each key refers to more than one alphabet, leaving it ambiguous to which alphabet the user may have had in mind to input. For instance, in most mobile phones, the key "2" refers to "abc" and key "7" refers to "pqrs". This kind of keypad is therefore called an ambiguous keypad in the related scientific literature. Multiple technologies have been introduced in recent times for text input mechanisms for touch-typable devices.

Multitap Technology:

Multitap is the first popular form of typing in English using an ambiguous keypad scheme, which depends on the user rapidly pressing any of the keys to refer to a particular key in the list of alphabets shown on it. For example, to type "b", a user would have to tap the Key 2 twice, and to type "s", the user would press the key 7 four times. This is called mutli-tapping and is a cumbersome, slow, and error prone process, as the user is susceptible to press the keys more number of times or less number of times than required. It is not very usable for the old or the ill because it relies on the user pressing the key at a minimum acceptable rate of one key press within a short duration (1 to 2 seconds), also referred to as multitap timeout. The above rate cannot even be slowed down because that would result in slowing down of the whole system. The multiple tap timeout is applicable in cases where words that have consequent alphabets printed on the same key, need to be typed. For example if the word "ORDER" needs to be typed, D and E being from the same key "3", would need a delay between the two inputs D and E to count as separate inputs and not part of the same multitap, which, on the other hand, would result in three consequent taps and hence an input of F. Single tap for D and two taps for E and a gap in the middle is therefore needed while entering "ORDER", which in effect would have a multitap timeout of a fixed duration for each input. Increasing this time out period slows down the whole text entry system. A multitap kill button mentioned in certain literatures would involve the pressing of yet another button to override the multitap timeout duration.

Dictionary Matches:

The next form to grow popular removes the need of multitapping. This technology asks the user to type in the word regardless of the ambiguities and the machine tries to remove the ambiguity by referring to an inbuilt dictionary to find a likely match. For example, if a user intends to type "MOTHER", he/she would go on pressing the keys 6-6-8-4-3-7. Since each of these keys (6-6-8-4-3-7) maps to three or more possible characters, it results in a large set of possible inputs (3*3*3*3*3*4=324 distinct word formations in the case of 6-6-8-4-3-7) that could have been intended. The software in the machine refers to the dictionary to prune down the possible sets of words only to the ones that are found in the dictionary.

This dictionary based technology works under the assumption that at most times the user would be typing in valid words from the English dictionary. This is not entirely true because of the prevalence of non dictionary words, proper nouns, names of places, people, numbers, shortened words, and abbreviations, etc, which are particularly common in personal messages sent from one to another over mobile phones due to the nature of the application. The words that are not in the dictionary have to be entered manually by the user through the same multitap technology described above and hence the user has to frequently change the mode from dictionary matching mode to manual entry mode. The process is cumbersome and a large percentage of users are unfamiliar as to how it is done. They have preferred to fall back on multi-tapping to type in all their texts. Also the total number of words in English is over 600,000 (Oxford English Dictionary 2'nd Edition) and since it is not considered feasible or desirable to include such a large dictionary on the typable devices due to cost, complexity and other limitations, a limited dictionary of only about 30,000 words (or 5%) is what is found in most implementations. In areas outside the English speaking locales, as in Malaysia or India, where the English keypad is the one which is used, the users are left to multi-tapping for all their words.

Another related issue that arises out of this strategy is called collision or dictionary collision. This refers to situations where two or more words in the dictionary refer to the same key sequence combination. For example, the 3 key sequence (2-6-9) refers to "any", "boy", "cow", "box"-four common words; and other less common words. In fact, for almost every word entered there is likely to be other collision words. Even though the other collision words are less likely to be present, one does come across words which were not intended to be used. A few common collisions that do occur frequently are (me, of), (kiss, lips), (good, home, gone). The list is large and gets larger when the dictionary size is made bigger, which is one of the reasons why the size of the dictionary is limited by the manufacturers. For every such collision, it is left to the user to detect the collision and to choose the right word. A means is generally provided to the user to choose from a list of possible other words, from a drop down menu or some other means on the input interface which involves a few extra key presses from the user.

In most cases, the user is looking at the printed alphabets on the keypad while typing and not at the screen, leaving the undesired collision words to go unnoticed on the screen. This results in the user having to review all the entered text before sending and if there is a collision word, the user has to manually move the cursor letter by letter over the entire text to make that small change.

Chording:

Chording is another method to enter text in which more than one keys are pressed at the same time or in some implementations in quick succession, quite like the Shift key used on a standard PC keyboard to create the distinction between upper and lower case letters and other symbols. In some cases the Control key, Alt key, Function keys are also used in a similar fashion. Such a strategy has also been used in handheld devices to increase the input choices from the limited keypad but have failed to become popular.

Mixed Strategy of Multitap:

There have also been other solutions, such as those in which Multitap and a likelihood prediction have been mixed. This approach merely changes the order in which the letters in the ambiguous keypad are offered after each multi-tap, the most likely letters being offered first, instead of the default order. This can reduce the total number of multi-taps required in an overall statistical sense. But a constant disambiguation role on the part of the user is necessitated and this is cumbersome. For instance, in case a user wants to type the word "WHICH", after typing "W", the technology shall, based on the statistical likelihood comparison between WG, WH, WI, give one of the letters as the output when the key "4" is pressed. In case the letter "I" has higher statistical likelihood, the user will have to select the key again (based on the mechanism of letter change or letter disambiguation) and then select letter "H", which leaves space for rework by the user and leads to more time consumption on ambiguous keypads. Also users of multitap who are sometimes capable of typing without looking at the screen now need to look at the screen to know which letter was predicted by the system.

All of these interruptions and necessary interventions expected from the user limit the usability currently offered for text inputs and therefore the users prefer to use the cumbersome but more straightforward multi-tap system to enter their text even when some or the other kind of dictionary matching scheme is supported on the majority of phones in the market.

There have been variations in the above described technologies in which there are larger number of keys to reduce ambiguation (assigning two letters to each key instead of three or four). There have been others who have theorized about the possibility of a more optimal choice of characters assigned to each key of the keypad to reduce collisions and thus reduce the number of times disambiguation that is required from the user. But no such keypads find popular usage for reasons of usability and intuitiveness. The most widely used form of keypad continues to be the one with 12 keys for entering the text. It is also impossible for printed disambiguation keypads to support multiple languages because there isn't that much of space on the face of a key.

There is therefore a need for systems and methods for text input that remove the ambiguity that is seen while typing with the existing keypads, a means to support many languages on the same keyboard and increase the speed with which the textual inputs can be given to multiple touch-typable devices.

OBJECT OF THE INVENTION

It is an object of the invention to provide an efficient system and method for entering input choices through touch-typable devices giving a smoother and seamless typing experience.

It is an object of the invention to remove ambiguity while typing with existing text input keypads.

It is another object of the invention to provide dynamic key assignment to provide most likely input choices based on ergonomic considerations.

It is an object of the invention to provide an effective system and method for entering textual input choices through minimal number of key presses.

It is an object of the invention to provide an effective system and method for entering textual input choices that saves user time.

It is another object of the invention to provide a system and method that allows characters and input choices to be input interchangeably in multiple languages.

SUMMARY

This disclosure is directed to techniques for improving usability and speed, and accuracy of text input to touch-typable devices. More particularly, the disclosure relates to text input to touch-typable devices such as mobile phones using an unambiguous keypad typing scheme for faster typing on limited keypads using a movable keymask and an optimized dynamic key assignment.

In an embodiment, the system includes a movable keymask displaying a sub-set of input choices from a set of possible input choices of one or more languages, wherein the movable keymask is present on the display of the touch-typable device as an image or in other representation formats. In an implementation, the movable keymask corresponds to the 3*4 text input key format (1-9, *, 0, and #) of a keypad of a touch-typable device such as a mobile device. Each key of the movable keymask can represent any alphabet and/or input choice from the possible sets of input choices, thereby eliminating any ambiguity of character and/or input choices such as one present on the keypad of a touch-typable device. The movable keymask can be steered by a user using the navigation and/or select keys of the text input keypad to see and select input choices other than the ones currently displayed on the movable keymask of the touch-typable device.

The system further includes dynamic key assignment configured to change the alphabet and/or input choice assignment of each key of the movable keymask to the valid and likely choices based on previous user inputs. The dynamic key assignment computes the most optimal key assignments for the alphabets and/or input choices based on statistical correlation and/or likelihood of occurrence between previous user inputs and one or more possible alphabets and/or input choices. In an embodiment, the dynamic key assignment is dictionary-less and computes assignments based on likelihood of an input choice occurring next in the input sequence based on the users previous inputs using phoneme and syllabary patterns. In a 3*4 keypad format based movable keymask, for instance, after each alphabet and/or input choice that a user selects, a new set of 12 input choices are assigned to the different keys of the movable keymask based on statistical correlation between the previous user inputs and the sets of possible input choices and phoneme and syllabary patterns of input choices.

On an assignment of the set of input choices to the keys of the movable keymask, a user can select any alphabet and/or input choice present on the keymask using the keys of the numeric text input keypad that correspond to the keys of the movable keymask present on the display of the touch-typable device.

In case the alphabet and/or input choice is not present in any of the first 12 keys of the dynamic key assignment, the user has an option of going to the next set of 12 most statistically correlated input choices and selecting the desired input choice from the set. In another embodiment, ergonomic considerations are given during dynamic assignments of the input choices to the keys based on factors such as the ease to reach keys of text input keypad by the thumb and the likelihood of the usage of a particular key in a particular dynamic assignment. A switchable and separate scheme for both right hand and left hand can also be provided while doing the dynamic assignment. In another embodiment, even while the alphabets are being dynamically assigned on each key press, the system tries to maintain persistence of key assignments from the most recent state to assist the user in quick searchability of the alphabets that he/she last used or looked at.

In another embodiment, while the alphabets and/or input choices are being dynamically assigned, the system allocates positions of the most likely alphabets to those positions on the keypad where they are found in the legacy keypad thereby improving the overall searchability of alphabets and improving the typing speed, particularly for users who are very familiar with the legacy keypad layout and are heavy users of multitap keying. The keys which are not placed in their legacy locations can be highlighted in a different color or some other manner to improve their searchability. In yet another embodiment, the most likely alphabets following an input from the user are dynamically assigned nearest to the last used key so that it is easy for the user to move his/her thumb to the nearest positions.

Multiple and varied implementations and embodiments are described below. After this discussion, representative implementations of systems, devices, and methods for text inputs to touch-typable devices using an unambiguous keypad typing scheme for faster typing on limited keypads using a movable keymask and an optimized dynamic key assignment are described.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Exemplary Environment

Figure 1:
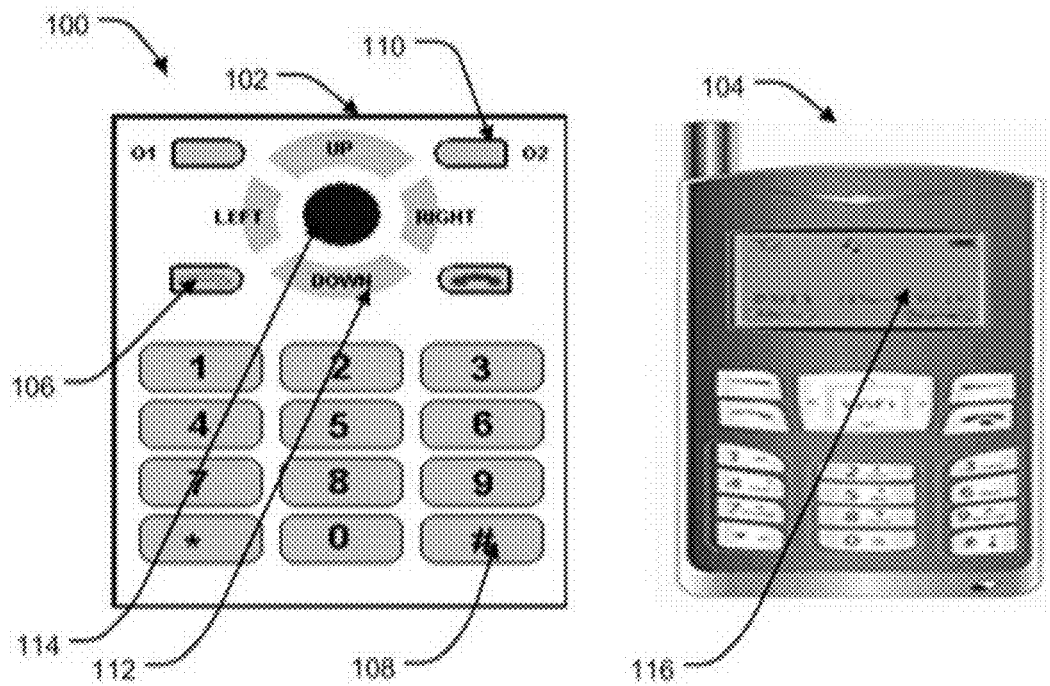
FIG. 1 illustrates a general keypad layout structure of a handheld device and a mechanism of entering textual input to hand-held communication devices.
Figure 1:
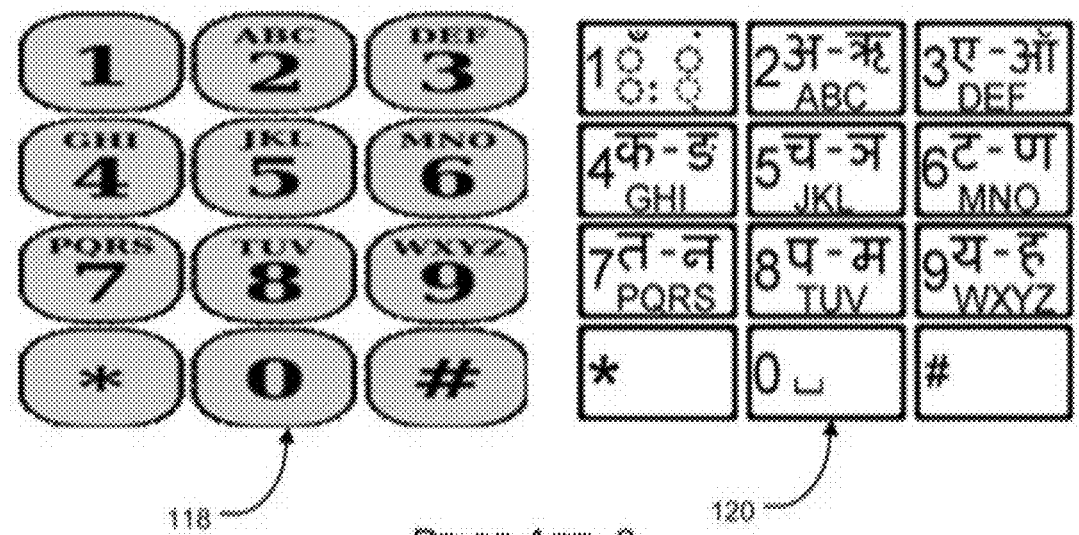

FIG. 1 illustrates a typical touch-typable device such as a mobile phone and a general ambiguous keypad layout structure of a touch-typable device for entering textual input to the device. FIG. 1 includes Prior Art-1 showing a typical touch-typable device such as a mobile phone and Prior Art-2 showing a general ambiguous keypad layout structure supporting one or more languages.

Prior Art-1 shows the structural layout of a typical touch-typable device 102 and a mobile phone 104. The touch-typable device 102 includes communication keys (green and red) 106, an ambiguous text input keypad 108, option keys 110, navigation keys 112, and a select key 114. The mobile phone 104 shows an exemplary layout of the keypad 102 and a display medium 116.

In an embodiment, a user inputs text using the ambiguous text input keypad 108 by pressing a combination of keys on the keypad 108 and the entered text is displayed on the display medium 116. The keypad 108 is also commonly referred to as an ambiguous keypad because each key on the keypad 108 refers to one or more alphabets and/or input choices as shall be seen in Prior Art-2, thereby making it ambiguous to identify as to which alphabet the user may have had in mind to input. In an embodiment, the ambiguous text input keypad 108 includes a standard 3*4 matrix format (3 columns*4 rows) layout for the keypad. In another embodiment, the navigation keys 112 are used while deleting and/or amending certain text inputs or for exploring other sections or applications of the touch-typable device. In yet another embodiment, the select key 114 is used for functionalities such as selection of a certain applications or to send text messages to one or more people, among multiple other functionalities. The option keys 110 are used for functionalities relating to exploring menu options of the device, selecting and/or exiting applications, among other functionalities.

Prior Art-2 shows two variants of an ambiguous text input keypad 108, a one language keypad 118 and a two language keypad 120. One language keypad 118 shows an ambiguous text input keypad having numeric as well as English alphabets printed on the keypad. Each numeric key from 2-9 refers to at least three different alphabets making the keypad ambiguous for a user while typing text. Such keypads incorporate technologies such as multitap, dictionary-based, and chording technologies for typing text inputs, as have already been discussed. For instance, in the multitap technology, in case a user needs to send "CX" as a word, he/she would need to press the numeric key "2" thrice and the key "9" twice. Similarly, the ambiguous text input keypad 120 incorporates two languages Hindi and English along with the numeric characters.

Figures 2, 2A, 2B:
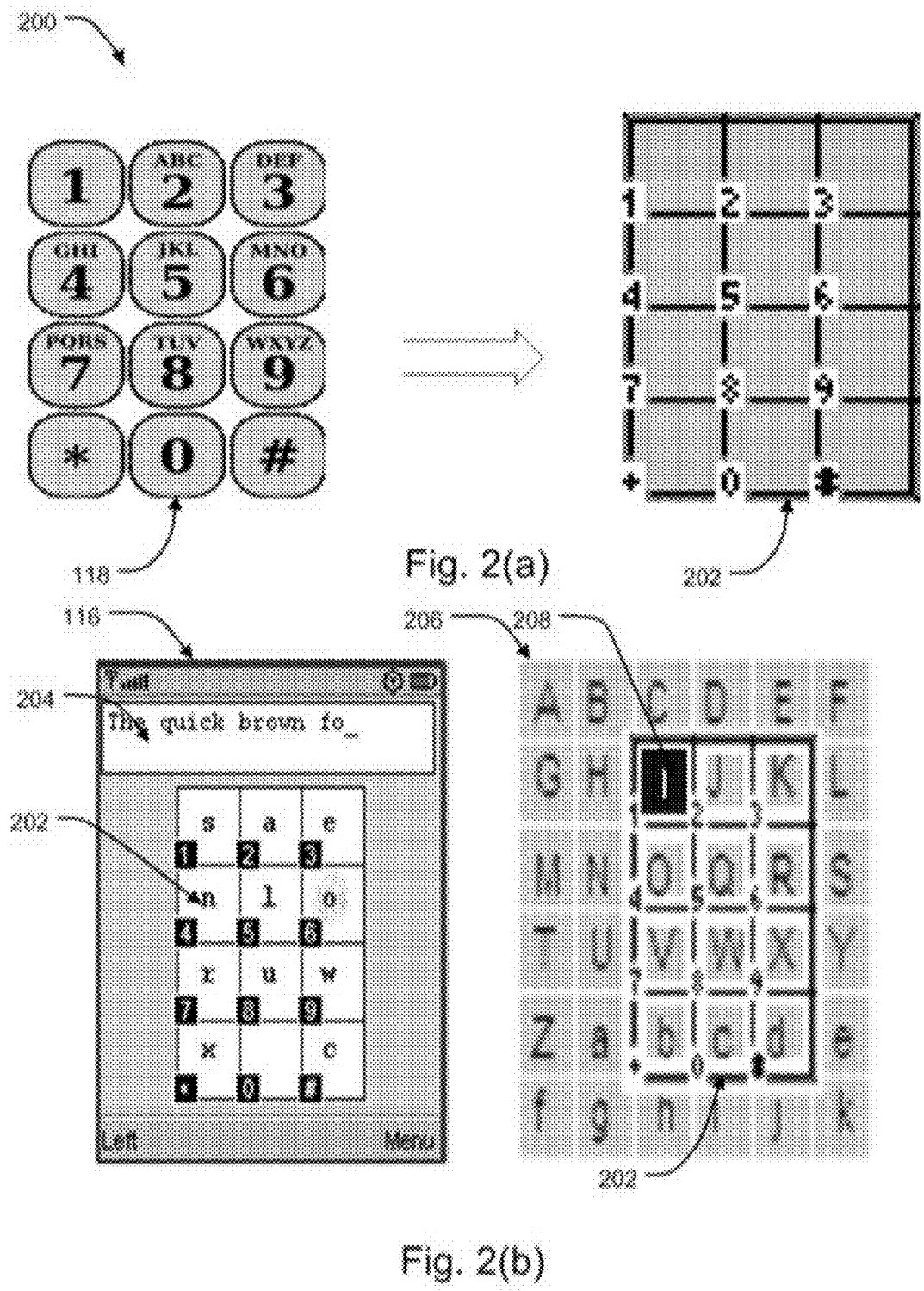
FIG. 2(a) illustrates an exemplary mechanism of generating a movable keymask from a text input keypad.
FIG. 2(b) demonstrates dynamic key assignment (DKA) configured to change alphabet and/or input choice assignment of each key of a movable keymask to valid and likely choices based on previous user input(s).

FIG. 2 illustrates an exemplary mechanism of entering textual input using an unambiguous keypad typing scheme for faster typing on limited keypads using a movable keymask and an optimized dynamic key assignment. FIG. 2(a) demonstrates generation of a movable keymask 202 from an ambiguous text input keypad 118. FIG. 2(b) demonstrates dynamic key assignment (DKA) configured to change the alphabet and/or input choice assignment to each key of the movable keymask to the valid and likely choices based on previous user inputs.

FIG. 2(a) shows generation of a movable keymask 202 from an ambiguous text input keypad 118. In an embodiment, the movable keymask 202, like the text input keypad 118, is in the form of a 3*4 matrix format (1-9, *, 0, and #) layout and each key of the movable keymask 202, also referred to as cells hereinafter, corresponds to the twelve keys of the ambiguous text input keypad 118. For instance, numeric key "3" of the ambiguous text input keypad 118 would correspond to the top right cell of the movable keymask 202. Similarly, key "#" of the text input keypad 118 would correspond to the bottom right cell of the movable keymask 202. In an embodiment, the movable keymask 202 can move along all the directions based on the navigation commands of a user. The navigation commands can be given by the user using the navigation keys 112.

In an embodiment, each cell of the movable keymask 202 can represent any alphabet and/or input choice from a set of input choices having characters, symbols, and/or other input options from one or more languages, thereby eliminating any possible ambiguity, such as the one present on the ambiguous text input keypad 118. The movable keymask 202 is also referred to as an unambiguous keypad hereinafter. This mechanism therefore allows the system to have an alphabet and/or input choice dynamically assigned to each cell of the movable keymask 202 allowing the user to select the input choice in one key press. Assignment of alphabets and/or input choices to cells of the movable keymask 202 is described below in FIG. 2(b).

FIG. 2(b) demonstrates dynamic key assignment configured to change the alphabet and/or input choice assignment of each cell of the movable keymask 202 to the valid and likely choices based on previous user inputs. FIG. 2(b) includes a display medium 116 of a touch-typable device that displays the interface for text input using an unambiguous keypad typing scheme. The display medium includes a movable keymask 202 and a text area section 204 configured to display the input choice typed by a user.

In an embodiment, the movable keymask 202 is in a 3*4 keypad format, wherein each key and/or cell of the movable keymask 202 corresponds to, or superimposes on, a specific alphabet and/or input choice. In an embodiment, cells of said movable keymask can be superimposed over one or more textual input choices. For instance, each cell can be assigned an alphabet and/or input choice based on dynamic key assignment that computes the statistical correlation between the previous inputs and the possible input choices and identifies a set of valid and likely input choices to be assigned to the cells of the movable keymask 202. In another embodiment, the dynamic key assignment computes the most optimal cell assignments for the alphabets and/or input choices based on statistical correlation between previous user inputs and one or more possible alphabets and/or input choices. In an embodiment, the dynamic key assignment is dictionary-less and is solely based on likelihood of an input choice to occur subsequent to a previous user input based on the statistical nature of syllabary of a particular language.

In an embodiment, each cell of a movable keymask 202 corresponds to the respective positional key on the ambiguous text input keypad 118. Consider that the text area section 204 shows the text message "The quick brown fo" entered by a user. The alphabets assigned to each cell of the movable keymask 202 are the most likely input choices to be entered after the sequence of previously entered words. These input choices are identified based on the statistical correlation and patterns of phoneme and syllabary between the previous inputs and the possible input choices. This shall be explained further with reference to FIG. 3. For instance, in the present sequence of words, there is a higher likelihood that the letter "x" is selected rather than the letter "y". As the cells of a movable keymask 202 correspond to respective positional keys on the ambiguous text input keypad 118, in case a user wants to select the alphabet "r", he/she would press the numeric key "7" on the ambiguous text input keypad 118. In case the alphabet "x" needs to be entered, the user would press the numeric key "*" to see the desired input choice in the text area section 204. Once the user has selected an alphabet and/or input choice, dynamic key assignment is again done to identify the next possible set of likely and valid input choices. This removes any ambiguity as each key on the movable keymask 202 corresponds only to one input choice.

In another embodiment, the movable keymask 202 can be superimposed on a character map 206 having one or more input choices for one or more languages. The movable keymask can be moved and/or steered in any direction through one or more keys on the ambiguous text input keypad 118 such as the navigation keys 112. Cell 208 of the movable keymask 202 is highlighted to display the current selected input choice by the user. Selection of the select key 114 on the ambiguous text input keypad 118 can enable the input choice highlighted by the cell 208 to be displayed as part of the text to be sent by the user. In case the user wants to select any other input choice, corresponding key on the ambiguous text input keypad 118 can be used for selecting such input choice. In an embodiment, layout of the input choices in the character map 206 is dynamically changed after an input choice is selected by a user, wherein the layout change is based on the likely and valid input choices to occur after the text entered previously by the user.

In an embodiment, in case the display 116 of the touch typable device and/or mobile phone 104 is small to accommodate both the text area section 204 and the movable keymask 202, a partial keymask can be used which can map to the corresponding keys of the ambiguous text input keypad 118. For instance, in case only six cells can be accommodated and/or displayed as part of the movable keymask 202, the six cells can be configured to correspond to numeric keys 1 through 6 of the ambiguous text input keypad 118 or can be configured to correspond to numeric keys 7 through # of the ambiguous text input keypad 118.

Figure 3:
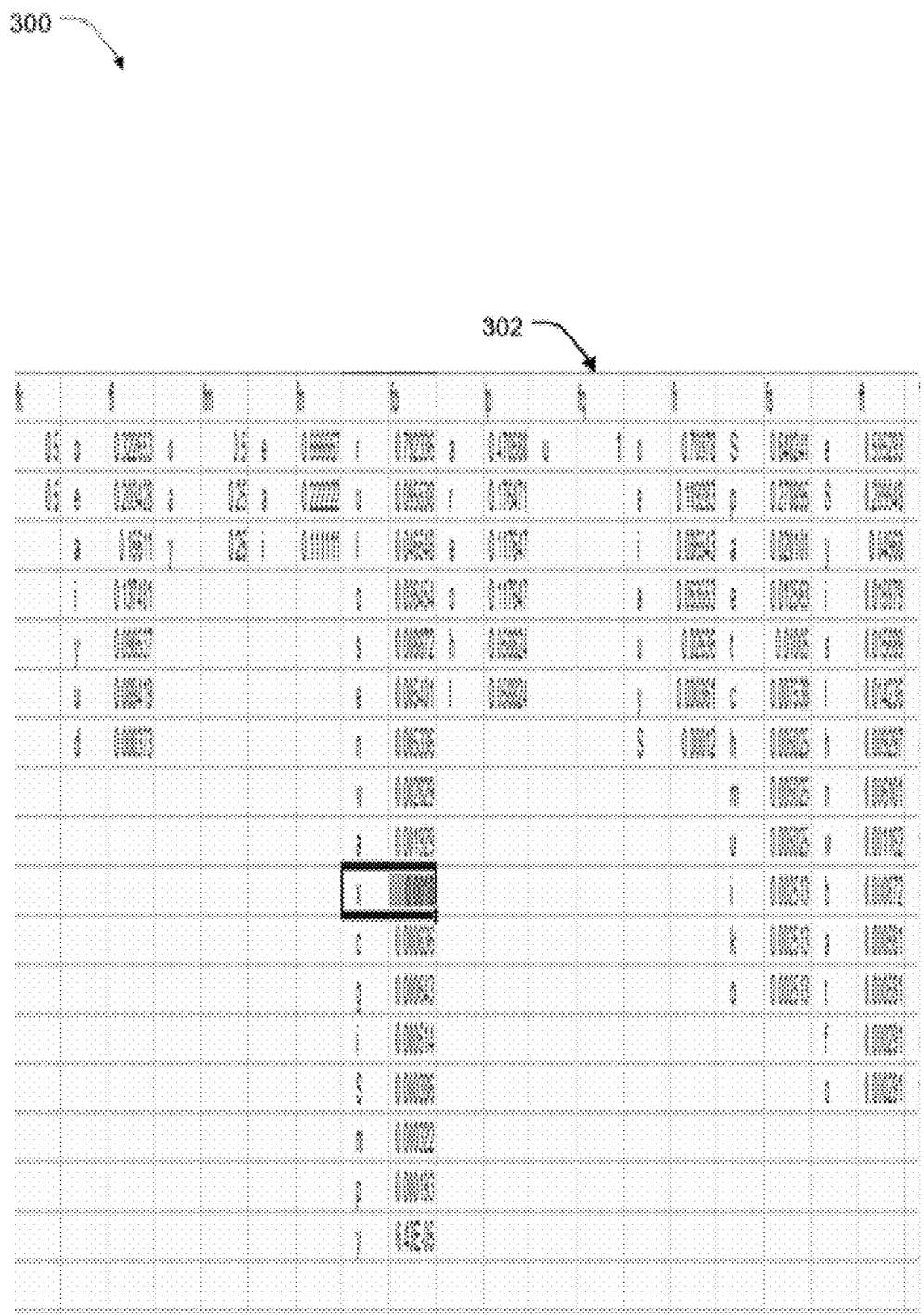
FIG. 3 illustrates the mechanism of identification of likely input choices to be assigned to one or more keys of the movable keymask based on the previous user inputs.

FIG. 3 illustrates the mechanism for identification of likely input choices to be assigned to one or more cells of the movable keymask 202 based on the previous user inputs. In an embodiment, identification of likely and valid input choices to follow a certain input sequence can be based on patterns of phoneme and syllabary. These patterns are observed not only across words from the Dictionary but also in proper nouns, names of people and places. For example, it would be impossible to pronounce words that have letters such as jfx, rpf, dbk, ncp, and so on and consequently these combinations are unlikely to occur in English usage both for dictionary and non dictionary words. Whereas it would be quite likely to find patterns like abi, pot, jon, tab, sur, dev and so on in English dictionary words as well as in names of people and places, because these are pronounceable and hence popular syllables and phonemes.

In another embodiment, existence and popularity of syllables and phonemes can also vary by language and region, for example "Priya" is a common name in India with a 3 letter combination of "iya" which is common in Indian words but not found in English. Phonemes like Jhha, Chha common in India are unfound in English. Similarly, the zka which is not extant in the English language would be a popular syllable in East Europe as in the names like Agnieszka, Ryszard, Szczepan from Poland. And similarly "qin" as in "qingshu" and "Zhao and Zheng" would be popular in Chinese but not in existence in the English syllabary. Therefore, based on the language in which text is being entered, probability of an input choice being selected can be determined based on the patterns of phoneme and syllabary that would work well for both Dictionary words as well non-dictionary words.

In another embodiment, it has been researched that in English language, of the 17576 possible trigrams (3 letter combinations formed from all the 26 letters of the English alphabet), 44% do not occur at all and 55% occur with extremely low frequencies. This implied that all the commonly found 3 letter combinations in the English language lie within a narrow spectrum of only 11% of the possibility space. Therefore, in an embodiment, the prediction system used for identification of likely input choices can be based on patterns of syllabary and phoneme found in a particular language and locale.

FIG. 3 includes a table 302 depicting the probabilities of occurrence of one or more alphabets and/or input choices after a sequence of inputs. For instance, the table 302 gives the probability of a set of listed alphabets to follow the input sequences such as "fk", "fl", "fo" . . . , "ft". As described in FIG. 2, the text area section 204 has a current input sequence ending with "fo", and therefore the system needs to evaluate the likelihood of one or more input choices following the sequence "fo". Based on the table 302, it can be noted that the probability of the alphabet "r" following "fo" would be 0.7923 and that of "x" following shall be "0.0018".

In an embodiment, the most likely 12 input choices (can include 11 input choices and the "space" key) can be identified from the table 302 based on their probability of occurrence after the entered sequence and can be dynamically assigned as first set of input choices, also referred to as first list dynamic key assignments hereinafter, to the cells of the movable keymask 202. The next set of 12 most likely input choices, also referred to as second list dynamic key assignments hereinafter, can then be identified and assigned to the cells and/or keys of the movable keymask 202.

In an embodiment, prediction of the most likely input choices can be based on one or more previously input characters. For instance, the predictions can be made based on previously input bigrams or based on previously input trigrams. Two letters occurring together are called a Bigram. Three letters occurring together are called Trigrams. For instance, in the word "uncle" there are four bigrams "un, nc, cl, and le" and three trigrams "unc, ncl, and cle" based on which the possible input choices can be predicted. In another embodiment, the possible input choices can also be predicted and assigned to the movable keymask 202 based on tetragrams pentagrams, or so on.

Figure 4:
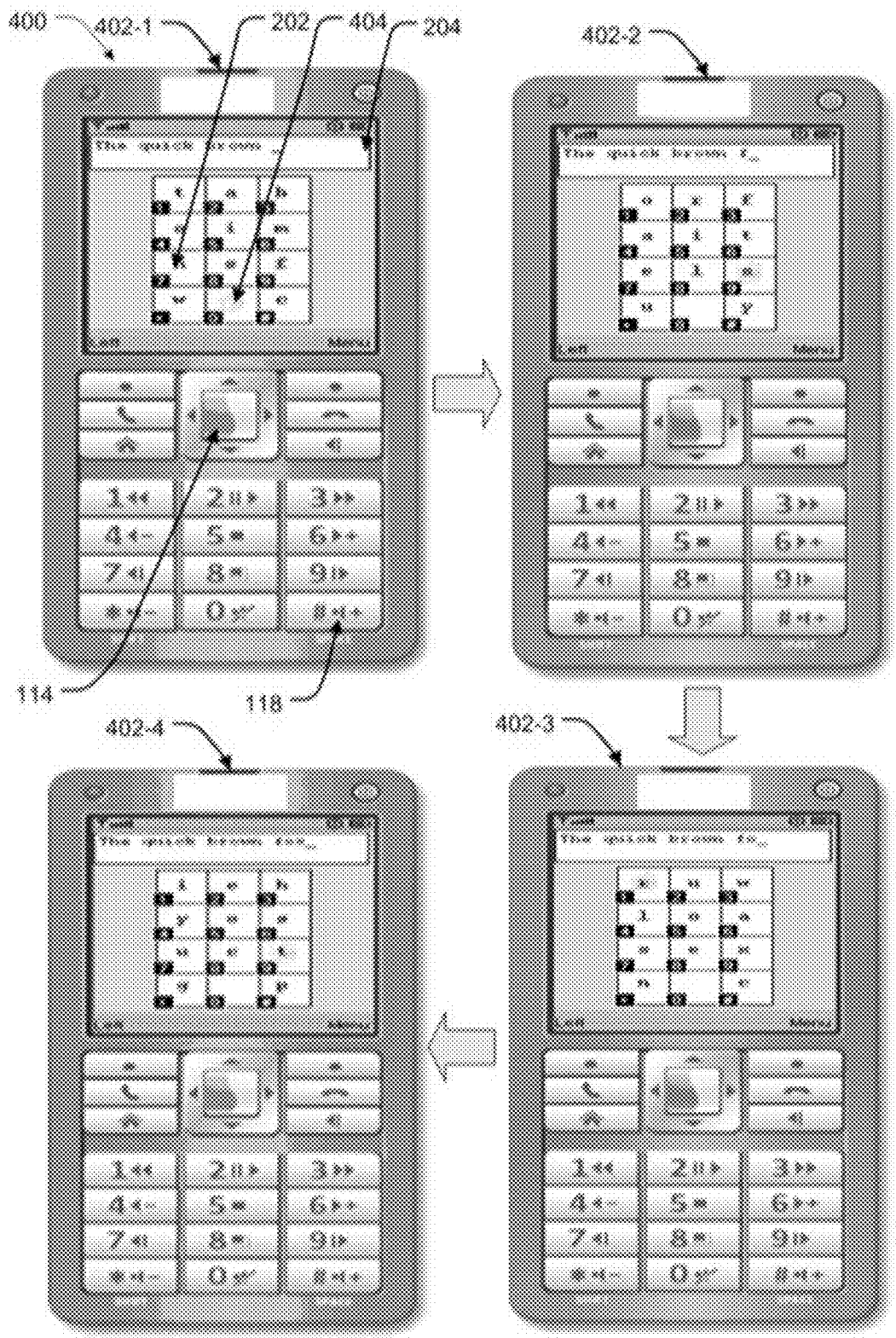
FIG. 4 illustrates an exemplary text input mechanism showing dynamic key assignment of alphabets and/or input choices to keys of the movable keymask based on a previous input sequence.

FIG. 4 illustrates an exemplary text input mechanism 400 showing dynamic key assignment of alphabets and/or input choices to cells of the movable keymask 202 based on a previous input sequence. The dynamic key assignment and selection of input choices have been shown through a sequence of assignment changes in the movable keymask 202 through changes in touch-typable device from 402-1 to 402-4.

Touch-typable device 402 shows an ambiguous text input keypad 118 for selecting input choices, a select key 114 to navigate to other lists of movable keymask 202 in case the desired input choice is not found in the first list, a movable keymask 202 showing dynamic assignment of input choices over the cells of the keymask 202, and a text area section 204 to see the entered input text. In an embodiment, the device 402 can be any touch-typable device such as a PDA, mobile phone, personal handyphone system (PHS), car phone, surface computer, pocket beeper, ATM's, STB's, touchscreen kiosks, gaming consoles, and remote control for display devices such as televisions. In another embodiment, other keys such as the navigation keys 112 can also be used for functionalities such as changing input choices from lower case to upper case or visa-versa to improve and fasten the access to multiple text input options.

In an embodiment, entered text in the touch-typable device 402-1 at present is "The quick brown". In an embodiment, the cell 404 represents the key last pressed and is represented by a "fingerprint image", which indicates the last key used and helps a user know where his thumb now lies. This offers the user a constant relative orientation which helps him/her in moving his/her thumb to the new positions without the need of looking at the numeric keypad. The cell 404 presently corresponds to "space", which indicates that after entering the text "The quick brown", the user pressed the space key. In another embodiment, multiple other representations can be incorporated to signify the last keys accessed for purposes of improving usability.

The device 402-2 shows the input choice "f" being selected by the user from the movable keymask 202 as shown in device 402-1. The input choice "f" is selected by using the key "9" on the ambiguous text input keypad 118 of device 402-1, which is why the corresponding key on the movable keymask 202 now displays the fingerprint image. Once the input choice "f" is selected by the user, the dynamic key assignment computes the next likely input choices based on the phoneme and syllabary patterns and assigns them to the cells and/or keys of the movable keymask 202. Movable keymask 202 of the device 402-2 shows the next likely set of input choices based on the statistical correlation between the previous input sequence and the available set of input choices. In an embodiment, the statistical correlation can be measured between the immediate previous input choice ("f" in our case) and the possible input choice set or can be measured between the complete and/or sub-set of previous input sequence and the possible input choice set.

The device 402-3 shows the input choice "o" being selected by the user from the movable keymask 202 in device 402-2. Input choice "o" is selected by pressing the key "1" of the ambiguous text input keypad 118 and therefore shows the corresponding key in the movable keymask 202 with a "fingerprint image". The device 402-4, on the same lines, intends to make the word as "fox" and therefore the user needs to press the key "9" on the movable keymask 202 in device 402-3, thereby selecting the input choice "x". The device 402-4 now shows the input sequence as "The quick brown fox" in the text area section 204.

In an embodiment, dynamic key assignment can be based on a combination of phoneme and syllabary patterns and words that occur in a dictionary to predict whole words or phrases. In another embodiment, the dynamic key assignment can be based on a self learning system, wherein the user's past inputs can be adopted and the system can dynamically assign the input choices based on the usage pattern of the user. For instance, a user may be using the word "definitely" habitually whereas others use "certainly". Also, a user from a province in Uzbekistan is likely to use certain phoneme constructs more frequently than a user in Thailand who could be using quite different syllables and phoneme constructs for his words when typed out in English using the popular English supported keyboard. These user preferences can be incorporates into the self-learning system based on which the preferred and likely input choices can be put across to the user as part of one or more lists of the movable keymask 202.

In another embodiment, the input text message as shown in text area section 204 can be compressed based on the statistical correlation. Data Compression technologies rely on statistical correlation of a language that leads to compressibility. Since all the static tables of character correlations are already inside the implementation for the dynamic keyboard application, it lends itself easily to data compression applicability. The data compression functionality can be built around the same statistical correlation data resident on the device. Data compression will enable transmission of messages which shall be compressed in data size and hence save costs and bandwidth requirements. Compression of the input text message also allows confidentiality during transmission of messages.

In yet another embodiment, the system can also be used for visually handicapped users, wherein each prediction and assignment of likely and valid input choices can be notified to such users through one or more auditory cues such as Braille code, Morse code, or any other suitable audio cues.

Figure 5:
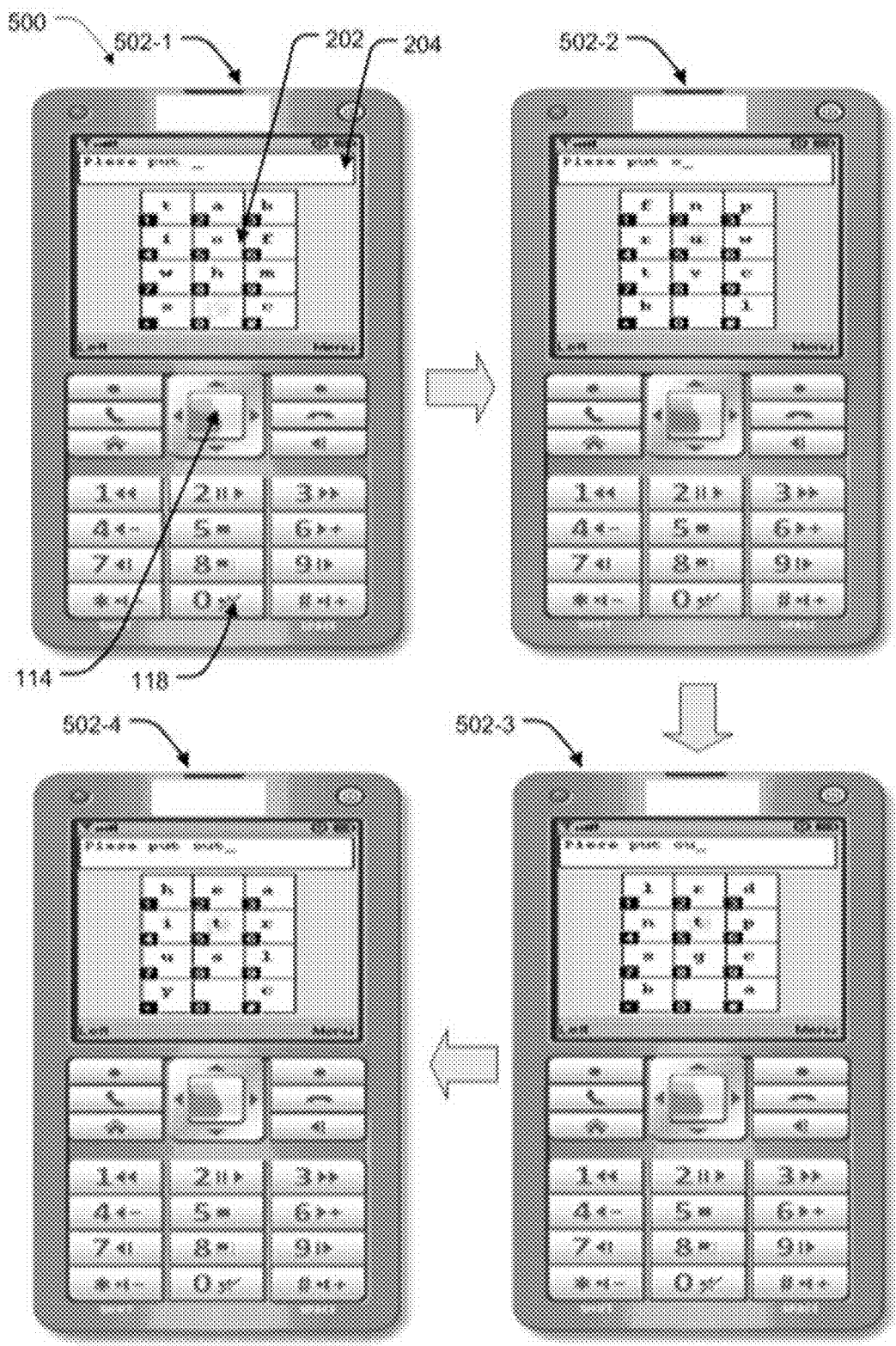
FIG. 5 illustrates an exemplary text input mechanism showing dynamic key assignment of alphabets and/or input choices to keys of the movable keymask based on a previous input sequence while maintaining assignment of the next most likely input choice to last key used.

FIG. 5 illustrates an exemplary text input mechanism 500 showing dynamic key assignment of alphabets and/or input choices to cells of the movable keymask 202 based on a previous input sequence while maintaining assignment of the most likely input choice exactly to the last key used. In another embodiment, one or more likely input choices can be assigned nearest to the last cell used. This embodiment makes it easier for the user to move his/her thumb to the nearest positions.

Assignment of the most likely input choice exactly to the last cell and/or key of the movable keymask 202 used has been shown through a sequence of assignment changes in the movable keymask 202 through changes in a touch-typable device from 502-1 to 502-4.

Touch-typable device 502 shows an ambiguous text input keypad 118 for selecting input choices, a select key 114 to navigate to other lists of movable keymask 202 in case the desired input choice is not found in the first list, a movable keymask 202 showing dynamic assignment of input choices over the cells of the keymask 202, and a text area section 204 to see the entered input text. In an embodiment, the device 502 can be any touch-typable device such as a PDA, and a mobile phone.

In an embodiment, entered text in the touch-typable device 502-1 at present is "Please put" and the desired input text string is "Please put out". The last key pressed, indicated by the "fingerprint image" is "space" corresponding to numeric key "0" on the ambiguous text input keypad 118. The device 502-2 shows the input choice "o" being selected by the user from the movable keymask 202 in device 502-1. The input choice "o" is selected by pressing the key "5" on the ambiguous text input keypad 118, which is why the corresponding key on the movable keymask 202 shown in device 502-2 now displays the fingerprint image. Once the input choice "o" is selected by the user, the dynamic key assignment computes the next likely input choices based on the previous input sequence and assigns them to the cells of the movable keymask 202 such that the most likely input choice is assigned exactly to the last key selected, which corresponds to numeric key "5".

The device 502-2 shows the input choice "u" at exactly the same position as was the alphabet "o" in the previous input, which corresponds to key "5" on the ambiguous text input keypad 118. This ensures ease for the user while selecting the input choice as the chances of "u" following "o" are high based on the statistical correlation between the entered input sequence and the next possible input choices allowing the user to directly press the key "5" again to input the desired alphabet.

The device 502-3 shows input of "u" by the user and shows the next most likely alphabet "t" at the same key position of "5" allowing the user to again press the key "5" to send the desired message. The device 502-4 shows the input of input choice "t" in the text area section 204.

Figure 6:
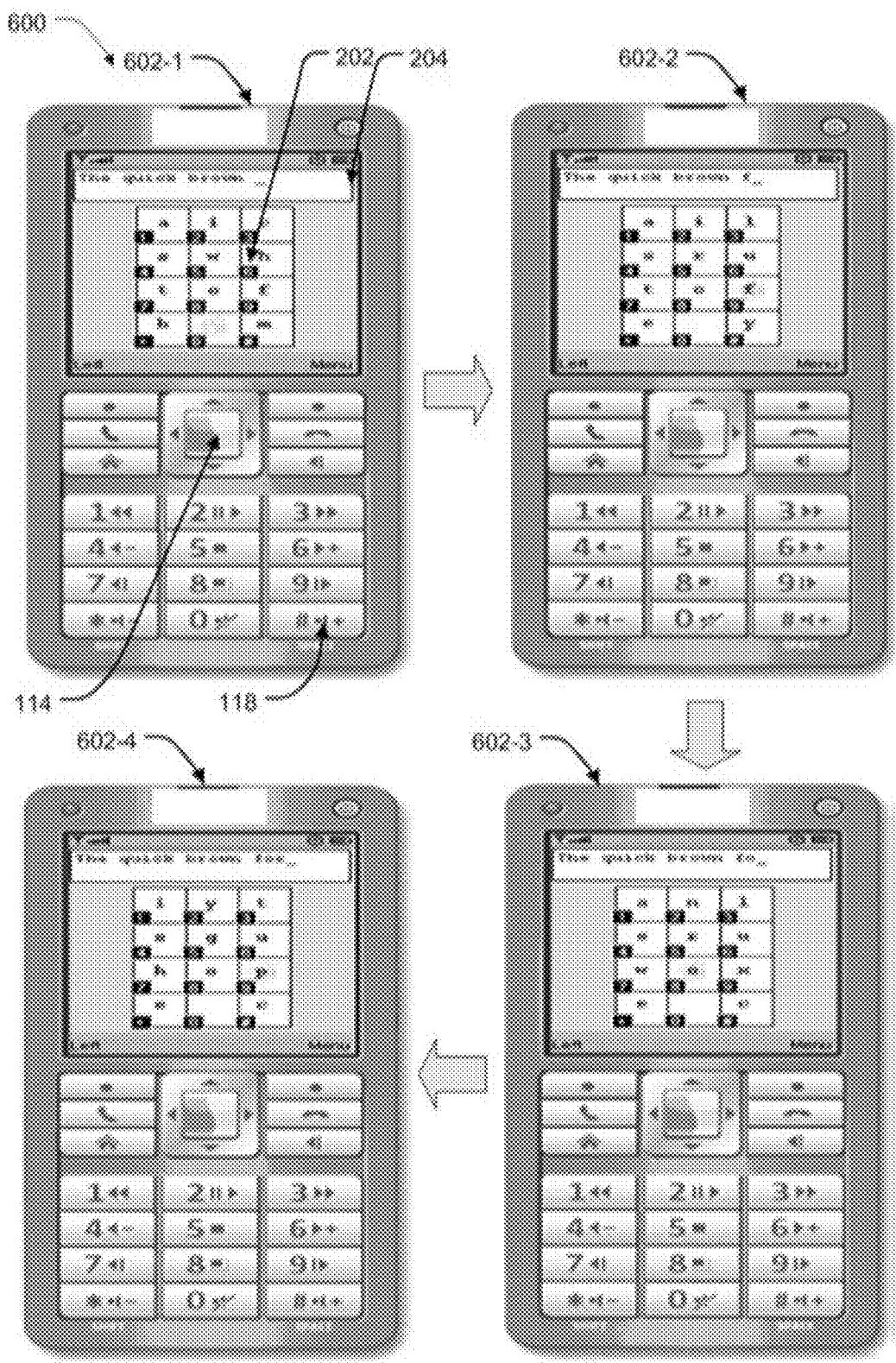
FIG. 6 illustrates an exemplary text input mechanism showing dynamic key assignment of alphabets and/or input choices to keys of the movable keymask based on a previous input sequence while maintaining persistence of assignments of input choices between transitory states.

FIG. 6 illustrates an exemplary text input mechanism 600 showing dynamic key assignment of alphabets and/or input choices to cells of the movable keymask 202 based on a previous input sequence while maintaining persistence of assignments of input choices between transitory states. Persistence relates to an input choice being assigned the same key on the movable keymask 202 in case it appears between two transitory states. Transitory states refer to the change in dynamic allocation of input choices to keys of the keymask 202 after each input of user. Therefore, while maintaining persistence, positions of the input choices that are repeated in the next key assignment do not change. The characters that are not found common between two states can be reassigned dynamically to new positions depending on their hierarchy in the list. This improves speed and usability in entering textual input due to the short term visual memory of the user. In an embodiment, gradual drifting of input choices from their ergonomic positions due to considerations of persistence between transition states can be reset everytime there is a hiatus in visual memory due to shift to second list or third list allocations (where there are no matches to a previous state) to ensure that letters are reset to allocations to their most ergonomic positions.

Persistence of the repeated input choices between transitions has been shown through a sequence of assignment changes in the movable keymask 202 through changes in a touch-typable device from 602-1 to 602-4.

Touch-typable device 602 shows an ambiguous text input keypad 118 for selecting input choices, a select key 114 to navigate to other lists of movable keymask 202 in case the desired input choice is not found in the first list, a movable keymask 202 showing persistent dynamic assignment of input choices to the cells of the keymask 202, and a text area section 204 to see the entered input text. In an embodiment, the device 602 can be any touch-typable device such as a PDA, and a mobile phone.

In an embodiment, entered text in the touch-typable device 602-1 at present is "The quick brown" and the desired input text string is "The quick brown fox". The last key pressed, indicated by the "fingerprint image", is space corresponding to the "0" key on the text input keypad 118. The device 602-2 shows the input choice "f" being selected by the user from the movable keymask 202 shown in device 602-1. The input choice "f" is selected by pressing the key "9" on the ambiguous text input keypad 118, which is why the corresponding cell on the movable keymask 202 shown in device 602-2 now displays the "fingerprint image". Persistence in dynamic key assignment is maintained between two transitions of the movable keymask 202 for such input choices, which are identified as likely to be selected by the user in the next transition as well. For instance, in case alphabet "a" is identified by the dynamic key assignment to have likelihood of selection in device 602-1 (after space) and also in device 602-2 (after "f"), the alphabet "a" shall be persistent to and accessible by the same key as it was in the last transition, which was at the key "1" of the ambiguous text input keypad 118. Similarly alphabets "i", "s", "o", "t", "f" are also kept persistent as they occur in both the dynamic key assignments. On the other hand, alphabet "c" does not occur in the movable keymask 202 of the device 602-2 and therefore is replaced by the character "1" which has higher likelihood of occurrence after "f" in the input sequence. In an embodiment, all input choices occurring commonly between two transitions can be kept persistent. In another embodiment, persistence can be maintained for certain input choices based on one or more criterions such as likelihood of occurrence, importance of input choice, priority of input choice, and relevancy of input choice.

The device 602-3 shows the input choice "o" after pressing of key "8" on the ambiguous text input keypad 118. The device 602-3 also maintains the desired persistence across transitions. The device 602-4 shows the input choice "x" after pressing of key "9" on the ambiguous text input keypad 118. The device 602-4 also maintains the desired persistence across transitions after dynamic key assignments.

Figure 7:
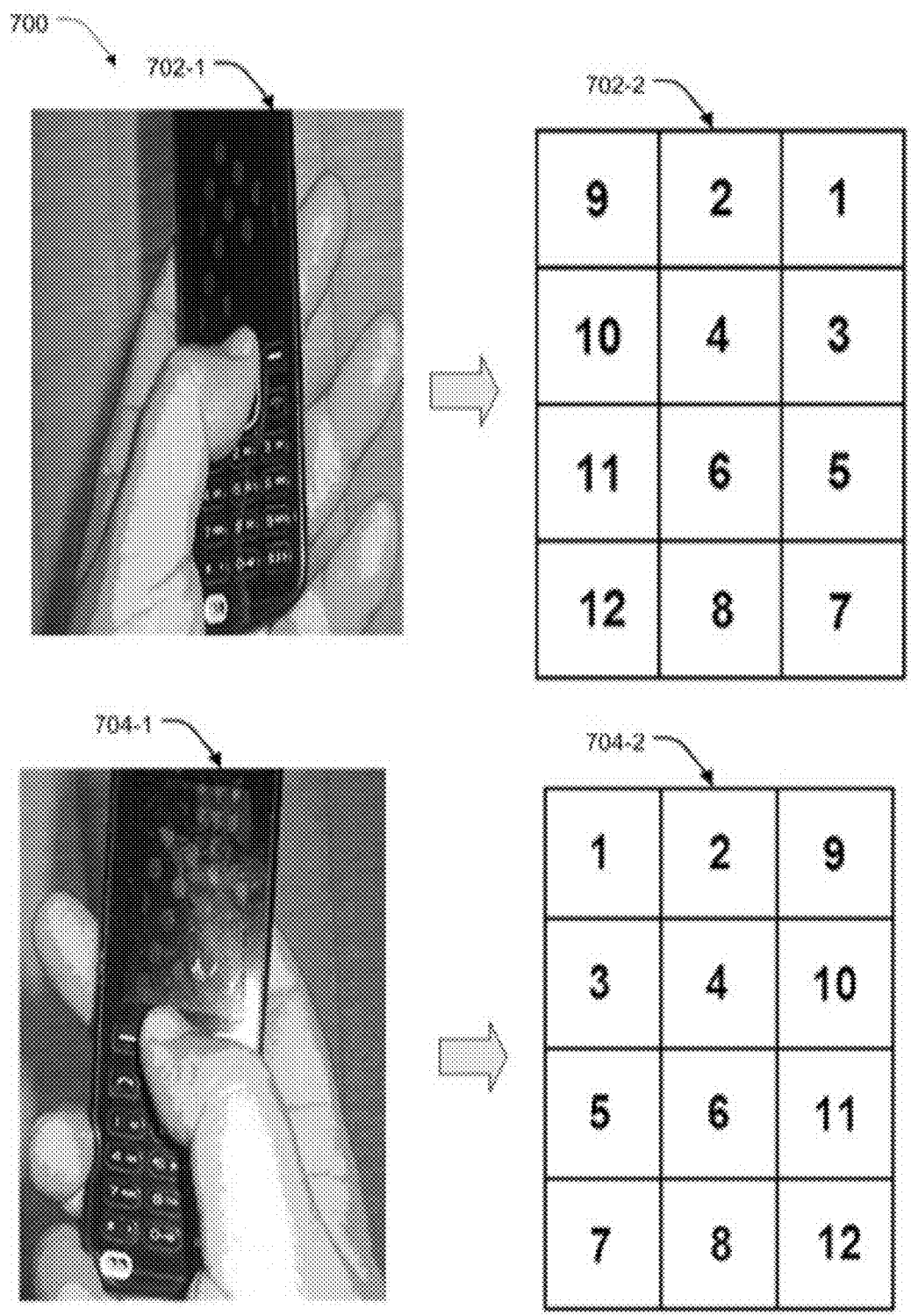
FIG. 7 illustrates an exemplary text input mechanism showing dynamic key assignment of alphabets and/or input choices to keys of the movable keymask based on a previous input sequence, wherein the assignment of likely input choices is done based on the hand in which the touch-typable device is held.

FIG. 7 illustrates an exemplary text input mechanism 700 showing the priority order in dynamic key assignment of alphabets and/or input choices to keys of the movable keymask 202 based on a previous input sequence, wherein the assignment of likely input choices is done based on the hand in which the touch-typable device is held.

In an embodiment, assignment 702 tends to prioritize the cells of movable keymask 702-2 for dynamic key assignment when a touch typable device is held in the left-hand. In an embodiment, when a touch typable device is held in the left hand, as depicted in 702-1, the keys on the rightmost column of the ambiguous input keypad 118 are more accessible when compared to the keys on the leftmost column of ambiguous input keypad 118. More likely input choices or an entered input sequence can therefore be assigned to keys on the rightmost column, which is as depicted in movable keymask 702-2. For instance, the top-right cell of the keymask 702-2 corresponding to key "3" of the text input keypad 118 is most easily accessible while typing and therefore has highest priority "1" as shown in movable keymask 702-2. In an embodiment, while dynamically assigning likely and valid input choices, the most likely input choice can be placed in the cell having the highest priority "1" in the movable keymask 702-2. For instance, in case after an input alphabet "d", alphabet "e" has the highest likelihood of selection, then "e" should be placed in the top-right cell and accessible to the user through key "3" of the text input keypad 118. Similar placing can be done for subsequent likely and valid input choices based on ease of access of keys to a user.

In an embodiment, assignment 704 tends to prioritize the cells of movable keymask 704-2 for key assignment when a touch-typable device held in the right-hand. In an embodiment, similar to 702, for a user holding a touch typable device in the right hand, as depicted in 704-1, keys on the extreme left column of the text input keypad 118 are more easily accessible when compared with the keys on the rightmost column. Therefore, higher priority on the keymask 704-2 is assigned to key corresponding to numeric "1" on the text input keypad 118 when compared to the numeric key "9" on the keypad 118. Dynamic key assignment of one or more input choices to one or more cells of the movable keymask 704-2 can then be done based on the priority of access of each key using the text-input keypad 118.

Figure 8:
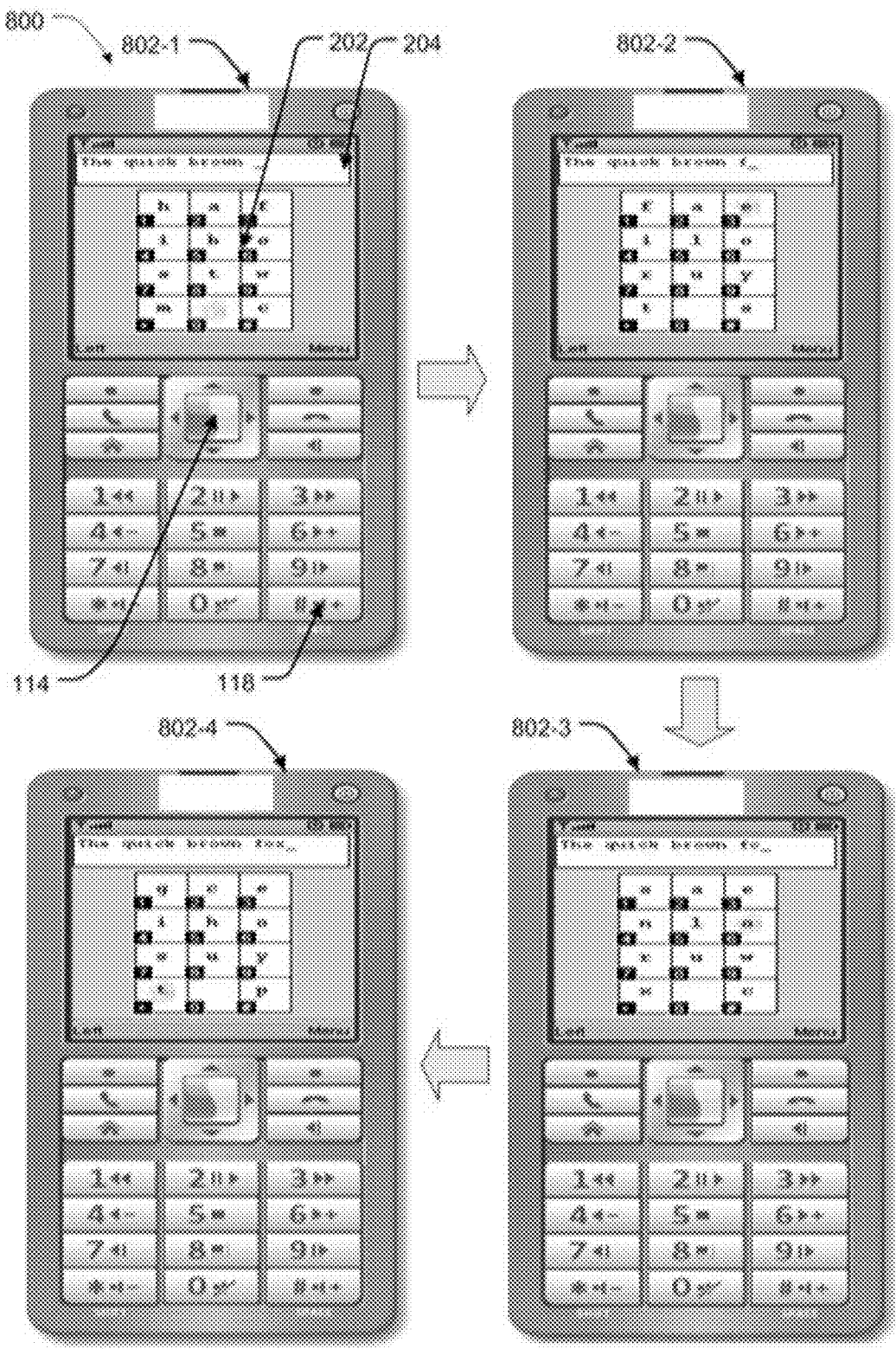
FIG. 8 illustrates an exemplary text input mechanism showing dynamic key assignment of alphabets and/or input choices to keys of the movable keymask, wherein the dynamic assignment is made keeping legacy text input keypad layout in context.

FIG. 8 illustrates an exemplary text input mechanism 800 showing dynamic key assignment of alphabets and/or input choices to cells of the movable keymask 202, wherein the dynamic assignment is made keeping legacy keypad system in context. In an embodiment, the legacy keypad system based dynamic key assignment ensures that likely and valid input choices are optimally assigned to positions on the movable keymask 202, which correspond to positions on which they are found on the ambiguous text input keypad 118. In an embodiment, the optimal assignment can be done based on a plurality of criteria such as likelihood of occurrence of the input choice, and priority of input choice. This improves the overall searchability of input choices for heavy users of legacy keypad layout thereby improving the overall typing speed.

Legacy keypad system based dynamic key assignment has been shown through a sequence of assignment changes in the movable keymask 202 through changes in a touch-typable device from 802-1 to 802-4.

Touch-typable device 802 shows an ambiguous text input keypad 118 for selecting input choices, a select key 114 to navigate to other lists of movable keymask 202 in case the desired input choice is not found in the first list, a movable keymask 202 showing legacy keypad system based dynamic assignment of input choices over the cells of the keymask 202, and a text area section 204 to see the entered input text. In an embodiment, the device 802 can be any touch-typable device such as a PDA, and a mobile phone.

In an embodiment, entered text in the touch-typable device 802-1 at present is "The quick brown" and the desired input text string is "The quick brown fox". The last key pressed, indicated by the "fingerprint image" is space corresponding to the "0" key on the text input keypad 118. In an embodiment, legacy keypad system based dynamic key assignment has been implemented on the movable keymask 202 shown in device 802-1. For instance, alphabets "a", "f", "i", "o", "s", "t", and "w" are present on positions which correspond to their actual positions on the legacy ambiguous text input keypad 118. In an embodiment, alphabet "b" is also present along with alphabet "a" on typical ambiguous text input keypad 118. However, as the likelihood of alphabet "a" being selected by a user is higher than alphabet "b" being selected, alphabet "b" is repositioned to correspond to numeric key "5" on the ambiguous text input keypad 118 thereby ensuring that in case of a collision between input choices that correspond to the same numeric key on an ambiguous text input keypad 118, the more likely input choice retains its legacy ambiguous text input keypad 118 based position. In another embodiment, the legacy keypad system based dynamic key assignment can also be based on persistence of assignment of an input choice to a movable keymask 202. In yet another embodiment, input choices that are not present in their legacy keypad position can be represented through a different color or representation to make the user understand that the input choices are not placed in positions in which they are seen in an ambiguous text input keypad 118. In yet another embodiment, bias in the dynamic assignment towards placement of alphabets in specific locations on the keyboard can also be left as a user choice or to other ergonomic considerations configured by the system, wherein the user and/or the system can choose between the most ergonomic placements or in tune with the legacy keyboard or an assignment of their own.

The device 802-2 shows input choice "f" being selected by the user from the movable keymask 202 shown in device 802-1. The input choice "f" is selected by using the key "3" on the ambiguous text input keypad 118, which is why the corresponding key on the movable keymask 202 shown in device 802-2 displays the "fingerprint image". In an embodiment, based on statistical likelihood of occurrence, "e" becomes more likely to occur after "f" than "f" itself and therefore the position of "f" is changed in the keymask 202 shown in device 802-2 from the keymask shown in device 802-1 and "e" is positioned at its legacy keypad position.

The device 802-3 shows the input choice "o" being selected by the user and legacy keypad system based dynamic key assignment being maintained on the movable keymask 202. The device 802-4 shows the input choice "x" being selected by the user by pressing numeric key "*" on the movable keymask 202 shown in device 802-3 and legacy keypad system based dynamic key assignment being maintained on the movable keymask 202.

Figure 9:
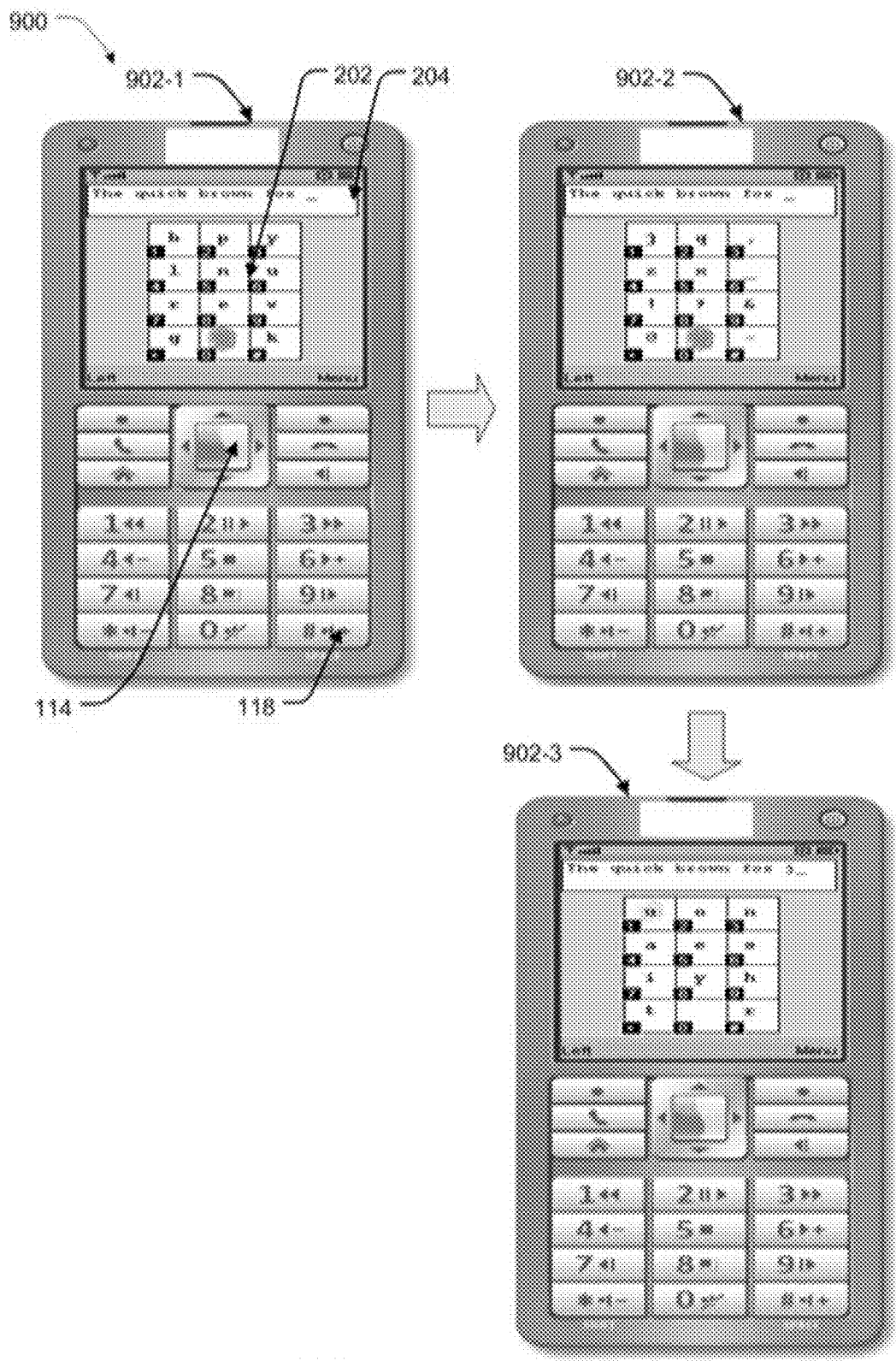
FIG. 9 illustrates an exemplary text input mechanism showing dynamic key assignment of alphabets and/or input choices to keys of the movable keymask, wherein desired input choice is not found in the first list of assignment on the movable keymask.

FIG. 9 illustrates an exemplary text input mechanism 900 showing dynamic key assignment of alphabets and/or input choices to keys of the movable keymask 202, wherein the desired input choice is not found in the first list of assignment on the movable keymask 202.

The text input mechanism has been shown through a sequence of assignment and list changes in the movable keymask 202 through changes in a touch-typable device from 902-1 to 902-3.

Touch-typable device 902 shows an ambiguous text input keypad 118 for selecting input choices, a select key 114 to navigate to other lists of movable keymask 202 in case the desired input choice is not found in the first list, a movable keymask 202 showing likely and valid input choices over the cells of the keymask 202, and a text area section 204 to see the entered input text. In an embodiment, the device 902 can be any touch-typable device such as a PDA, and a mobile phone.

In an embodiment, entered text in the touch-typable device 902-1 at present is "The quick brown fox" and the desired input text string is "The quick brown fox j". The last key pressed, indicated by the "fingerprint image" is "space" corresponding to the "0" key on the text input keypad 118.

In an embodiment, as shown in device 902-1, the desired alphabet choice "j" is not present in the first (1'st) list as shown in the movable keymask 202 in device 902-1. A user may therefore need to move to the second (2'nd) list to access and select the desired alphabet. For this, in an embodiment, the user can press the select key 114 to navigate to the 2'nd list as shown in movable keymask 202 of device 902-2. In another embodiment, any other key, such as the navigation keys (right, left, top, and bottom), top-left key, or menu key can be configured to shift to the 2'nd list. In yet another embodiment, navigation keys can also be mapped to images being displayed on the display 116 of the mobile phone, wherein rather than navigating to other lists of input choices through the navigation keys of the text input keypad 118, other lists can also be accessed by clicking the images present on the display 116 of the mobile phone.

The device 902-2 shows the desired input choice "j" at the position that corresponds to the numeric key "1" of the text input keypad 118. The user can select the desired alphabet by pressing the numeric key "1" and output of the same can be seen at 902-3 with the text area section 204 showing the input choice "j".

Figure 10:
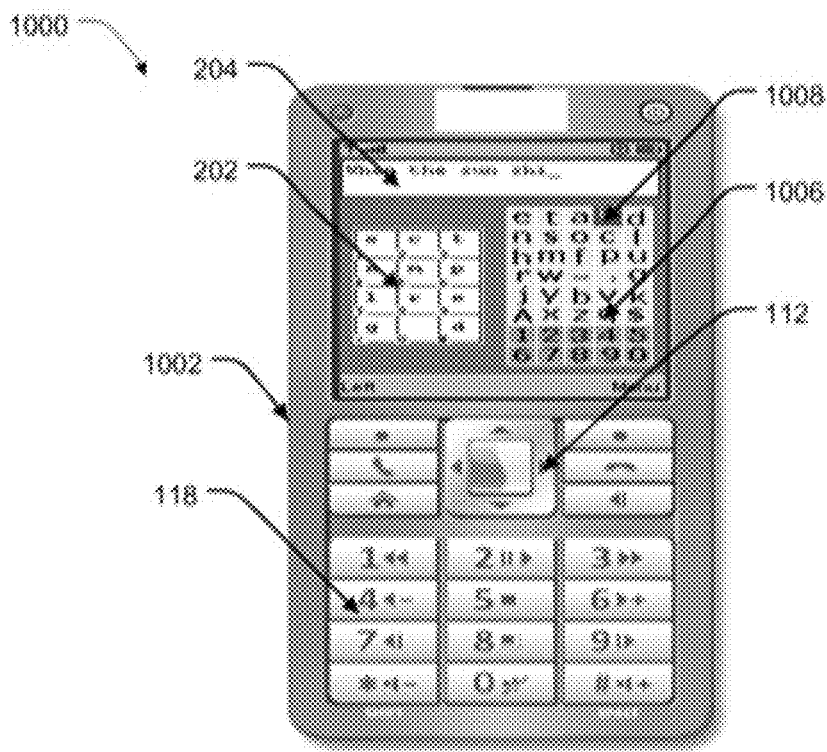
FIG. 10 illustrates an exemplary text input mechanism showing dynamic key assignment of alphabets and/or input choices to keys of the movable keymask, wherein the movable keymask is placed alongside a character map having possible input choices of one or more languages.
Figure 10:
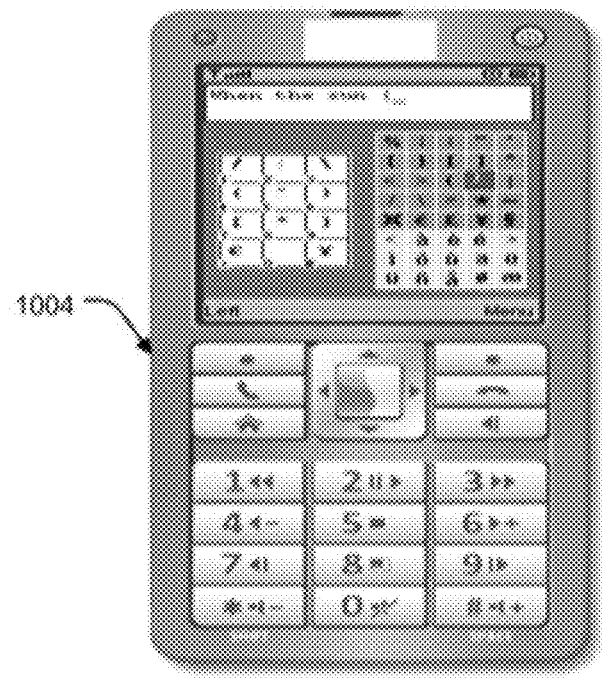

FIG. 10 illustrates an exemplary text input mechanism 1000 showing dynamic key assignment of alphabets and/or input choices to cells of a movable keymask 202 through touch-typable devices 1002 and 1004, wherein the movable keymask 202 is placed alongside a character map 1006 having possible input choices in one or more languages.

In an embodiment, touch-typable device 1002 includes navigation keys 112 configured to move the input choice selection cursor 1008 (highlighted in red) on the character map 1006. In an embodiment, the cursor 1008 can be represented in any manner for selection of one or more input choices. The touch-typable device 1002 further includes an ambiguous text input keypad 118 for selection of input choices from movable keymask 202.

In an embodiment, the character map 1006 includes all possible input choices in one or more languages accessible through one or more keys of the ambiguous text input keypad 118. Dynamic key assignment of input choices over the movable keymask 202 is configured to change dynamically based on the input choice highlighted by the cursor 1008. In an embodiment, the user can either select the input choice from the character map 1006 using the select key 114 or select the choice from the movable keymask 202 using the text input keypad 118.

In another embodiment, if the desired input choice is not present in the movable keymask 202, the user can either navigate to the 2'nd or 3'rd dynamic key assignment list of the movable keymask 202 or can select the desired input choice from the character map 1006, which would dynamically reflect the next likely and valid input choices in the movable keymask 202. In yet another embodiment, the movable keymask 202 can be superimposed over the character map 1006 to dynamically change the character map 1006 and therefore also change the movable keymask 202 based on the input choice selected by the user. In another embodiment, the device 1004 shows the character map 1006 having symbols as input choices, based on which the cells of the movable keymask 202 have been dynamically assigned with the next likely and valid symbols. In another embodiment, the symbols can be GSM 3.82 specification compliant and can be accessed by the user using one or more keys such as the select key 114, the navigation keys 112, or other keys on the touch-typable device.

In an embodiment, the character map 1006 along with the movable keymask 202 can be available for multiple languages. In another embodiment, the system allows a user to enter input text using the movable keymask 202 in a language known to the user, and can send the text in a desired language not known to the user. The system therefore allows automatic transliteration of text inputs between languages. This is possible because in major Indian languages namely Hindi, Bengali, Telugu, Marathi, Tamil, Gujarati, Kannada, Oriya, Malayalam, Punjabi, Assamese, each language has its own script and alphabet set, however, all of these languages offer large unity amongst them having descended from the same language root of Brahmic languages and therefore offer high chances of correct automatic transliteration.

It is to be noted that the movable keymask 202 has been illustrated in a 3*4 format only for exemplary purposes and no limitation should be applied to the format and scope of design of the movable keymask 202.

Figure 11:
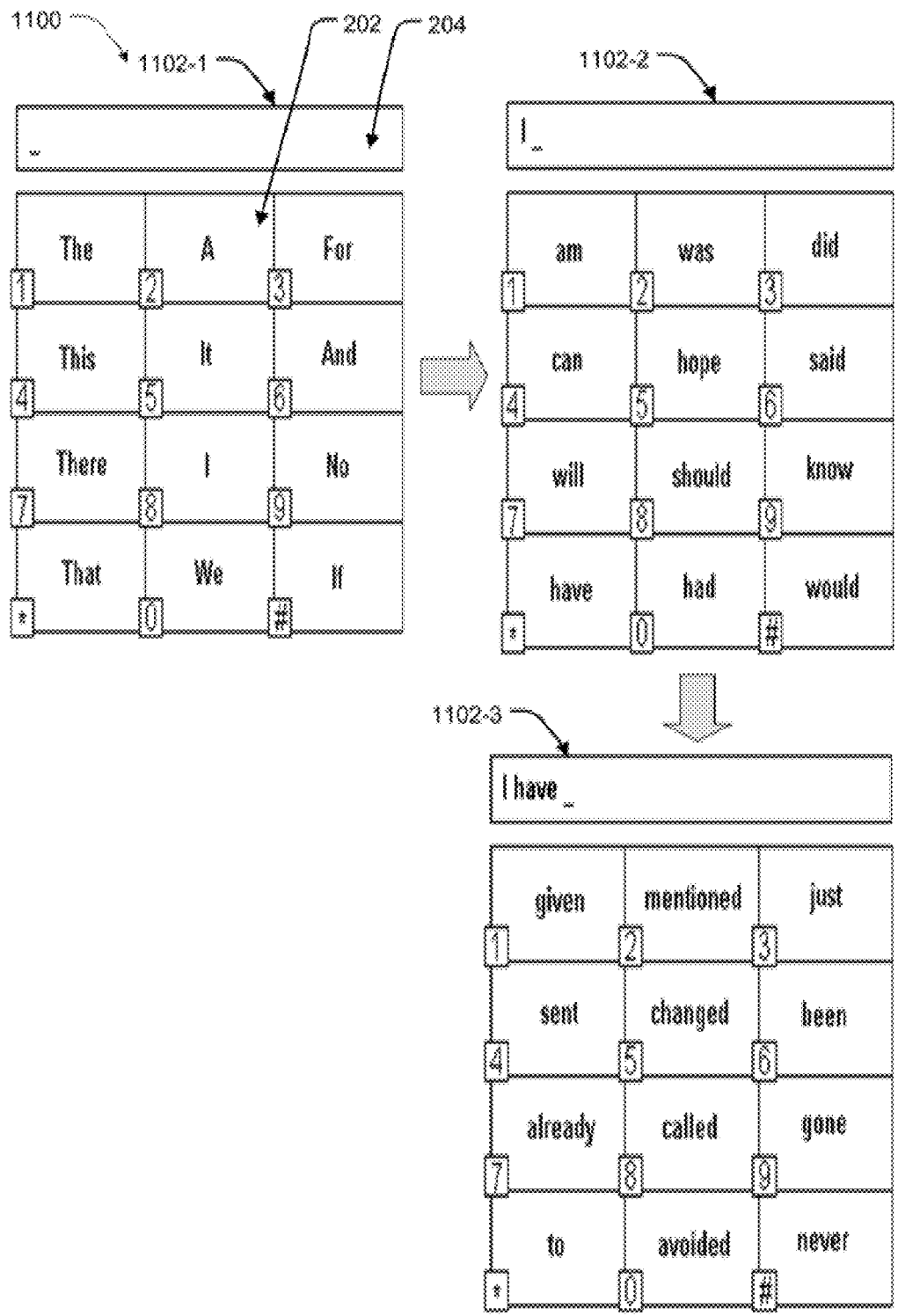
FIG. 11 illustrates dynamic key assignment for prediction of words and phrases based on previous inputs of the user.

FIG. 11 illustrates dynamic key assignment for prediction of words and phrases based on previous inputs of the user. In an embodiment, the dynamic key assignment described in above embodiments for letters can be used for prediction of words and phrases based on previous inputs of the user. This could be done using statistics, grammar rules, context discovery and self learning from users own previous writing. The plurality of options offered at every decision point ensures that this multiplies the user options that can be entered in an unambiguous manner into the text.

The text input mechanism using dynamic key assignment for prediction of words and phrases has been shown through a sequence of assignment and list changes in the movable keymask 202 through changes in the display 1102-1 to 1102-3 of a touch-typable device.

Display 1102 shows a movable keymask 202 showing likely and valid input words and phrases over the cells of the keymask 202 based on previous user input, and a text area section 204 to see the entered input word and/or phrase. In an embodiment, the device 1102 can be any touch-typable device such as a PDA, and a mobile phone.

In an embodiment, the display 1102-1 shows no entered text in text area section 204. The display further shows likely and valid input words and phrases that a user has high probability to select while starting the word and/or phrase input.

In an embodiment, the display 1102-2 shows the word "I" being selected by the user by the press of numeric key "8" and shows a set of words and/or phrases likely to follow the previous input sequence in the movable keymask 202.

The display 1102-3, similarly, shows the word "have" being selected by the user by the press of numeric key "*" on the movable keymask 202 as shown in display 1102-2 and shows a set of words and/or phrases likely to follow the previous input sequence in the movable keymask 202.

Figure 12:
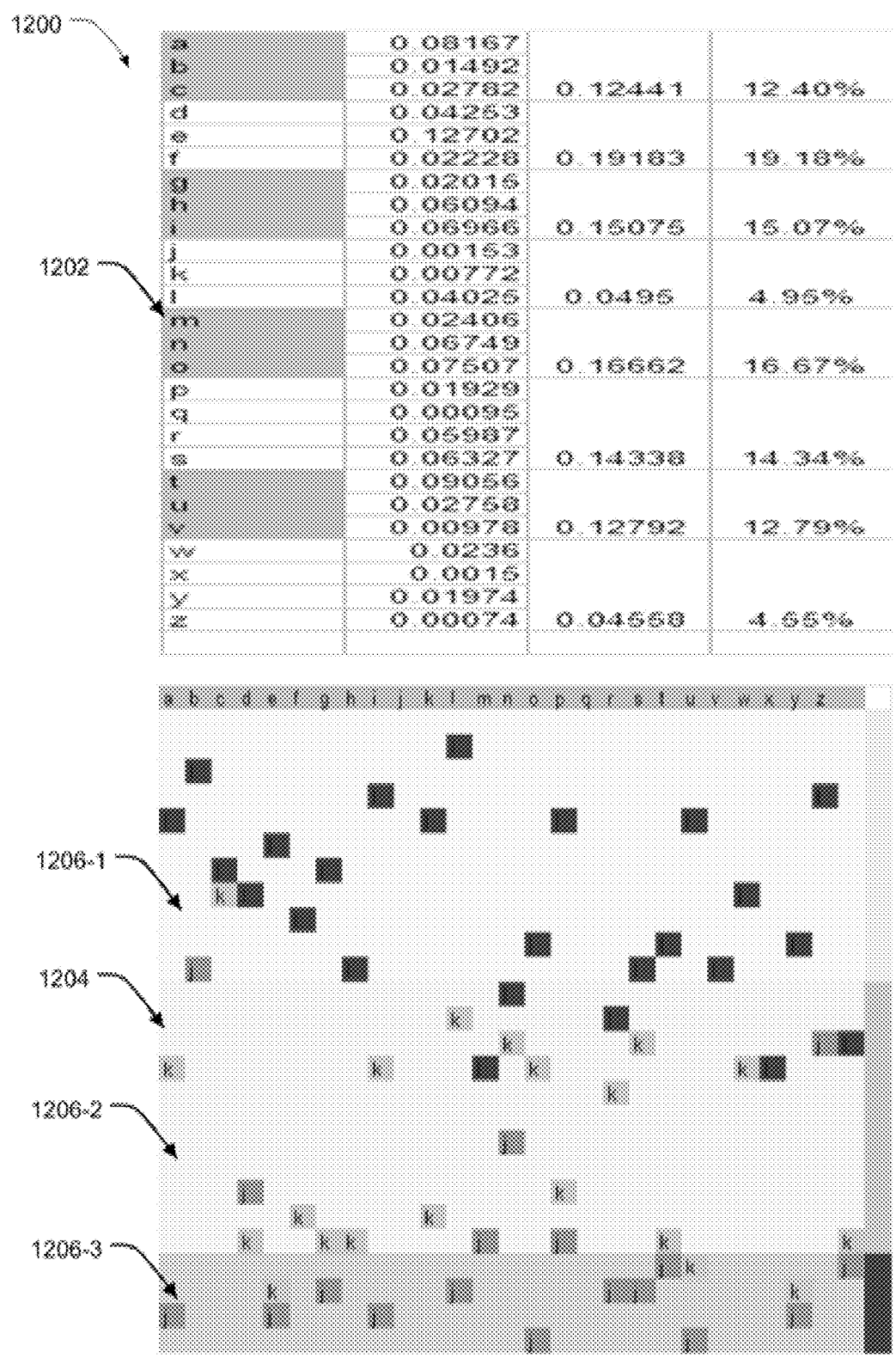
FIG. 12 illustrates the uneven usage of the keys on an ambiguous legacy text input keypad.

FIG. 12 illustrates the uneven usage of the keys on an ambiguous text input keypad 118. The mechanism 1200 includes a chart 1202 representing load on an ambiguous text input keypad 118 due to usage of keys of the keypad 118 while selecting characters from relevant English corpus. The mechanism 1200 further includes a graph 1204 representing distribution of the characters "J", "K", and "L" allocated to numeric key "5" on the ambiguous text input keypad 118 across three dynamic key allocations (DKAs).

The chart 1202 shows the likelihood of keys being used on an ambiguous text input keypad 118 for characters from English corpus. In an embodiment, higher the likelihood of keys being used, higher is the likelihood of usage of the respective keys of the ambiguous text input keypad 118. Higher load may cause an uneven distribution of usage of keys on the keypad 118, which can otherwise be optimally redistributed over multiple keys of the keypad 118 for improving the dynamic key assignment when legacy keypad assignment, semi-permanent assignment to certain keys, or some other assignment needs to be offered. In an embodiment, redistribution of load is required while dynamically assigning input choices to movable keymask 202 when the dynamic key assignment incorporates assignment based on the legacy keypad systems so as to enable more likely keys to retain their legacy keypad position. In another embodiment, other ergonomic considerations based on frequency of usage can also be incorporated while redistributing the load.

In an embodiment, the chart 1202 demonstrates that usage of the numeric key "5" corresponding to "jkl" on the text input keypad 118 is about 4.95% signifying that the numeric key "5" is likely to be used only 5% of the time. Similar is the case with numeric key "9", which corresponds to "wxyz" and is likely to be used only 4.55% of the time. It can be noted that due to higher usage of the alphabet "e", key "3" is most likely (19.18%) to be used. In an embodiment, distribution of the input choices can be done so as to balance the likelihood of keys being pressed across DKAs thereby improving the overall statistical likelihood of alphabets being assigned semi permanent positions. In another embodiment, with an optimal distribution of input choices there are lesser cases of coincidences where two characters marked to the same numeric key on the ambiguous text input keypad appear together in a dynamic key assignment.

The graph 1204 shows the distribution of characters J, K, L allocated to the numeric key "5" in the ambiguous text input keypad 118 across three dynamic key assignments 1206-1, 1206-2, 1206-3. In an embodiment, the three dynamic key assignments (DKAs) refer to the likelihood of J. K. and L being the input choice after any character of the alphabet. In an embodiment, the three characters J, K, L show a good divergence between each other across the three DKAs. For instance, in the first DKA 1206-1, the alphabet "L" dominates the likelihood of presence. This means that after each of the alphabets from "a-z" as shown in the top section in gray color, the alphabet "L", among the other alphabets J, K, and L, has the highest likelihood of selection as the input choice in the first DKA. For example, in the first DKA, in case "a" is an input choice selected by a user, then "1" is most likely to follow "a" as the next input choice when compared with other two characters "j" and "k". Therefore, in case, all alphabets "J", "K", and "L" are likely to come in the first list, alphabet "L" should be allocated the position corresponding to its original position of key "5" as it has higher precedence. Therefore, due to a strong divergence between the characters J, K, and L between the three DKAs there will be very few instances where any of these three characters will clash with each other in the three DKAs to be assigned the legacy position of numeric key 5. In an embodiment, these are considerations can guide the design of a fully optimized key assignment.

Figure 13:
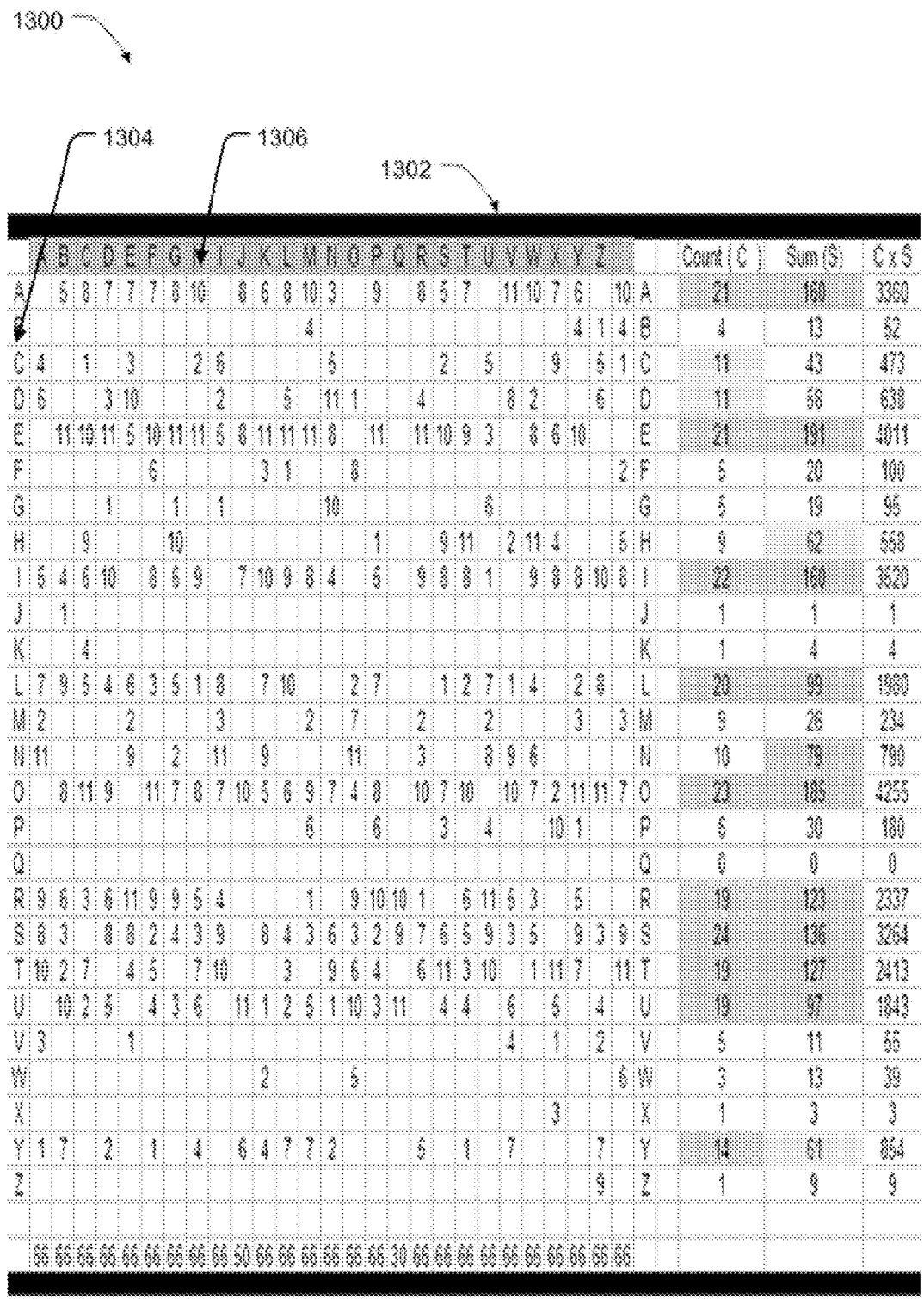
FIG. 13 illustrates a mechanism for calculation of a scheme to allocate possible permanent positions to certain alphabets and/or input choices based on their likelihood to occur in a dynamic assignment across all possible previously entered input choices.

FIG. 13 illustrates a mechanism 1300 for calculation of a scheme to allocate possible permanent positions to certain alphabets and/or input choices based on their likelihood to occur in a particular dynamic assignment across all possible previously entered input choices. In an embodiment, the chart 1302 shows the priority of each character 1304 (Y-axis) in the second (2'nd) dynamic key assignment based on a previous character input 1306 (X-axis shown in gray). Priority refers to the importance of an input choice character 1304 after an entered input character 1306. For instance, for an entered input character 1306 "A", input choice character 1304 "N" has the highest priority in the 2'nd dynamic key assignment, which is 11 "Y" has the lowest priority within second DKA which is 1. and therefore N has the highest likelihood of occurrence after "A". Therefore N has the highest likelihood of being pressed after an occurrence of "A" and hence merits a more ergonomic position in the keypad.

In another embodiment, for assignment of input choices to semi-permanent locations in a fully optimized keypad scheme, likelihood of occurrence will be decided not only for A as the previous input but also based on the priority of N (or Y) across all previous inputs.

In an embodiment, Count (C) indicates the total number of occurrences of a particular character 1304 in the 2'nd dynamic key assignment across the range of possible previous character inputs 1306. For instance, "S" can is seen to occur maximum number of times (24 times) in the 2'nd dynamic key assignment, which is higher than "E", which occurs the maximum number of times in the 1'st dynamic key assignment. Sum (S) is the sum of priorities for one or more input choice characters 1304. C*S refers to the overall importance of an input choice character 1304 in the second dynamic key assignment.

Exemplary Methods

Exemplary methods for entering textual input using an unambiguous keypad typing scheme for faster typing on limited keypads using a movable keymask and an optimized dynamic key assignment are described with reference to FIGS. 2-13.

Figure 14:
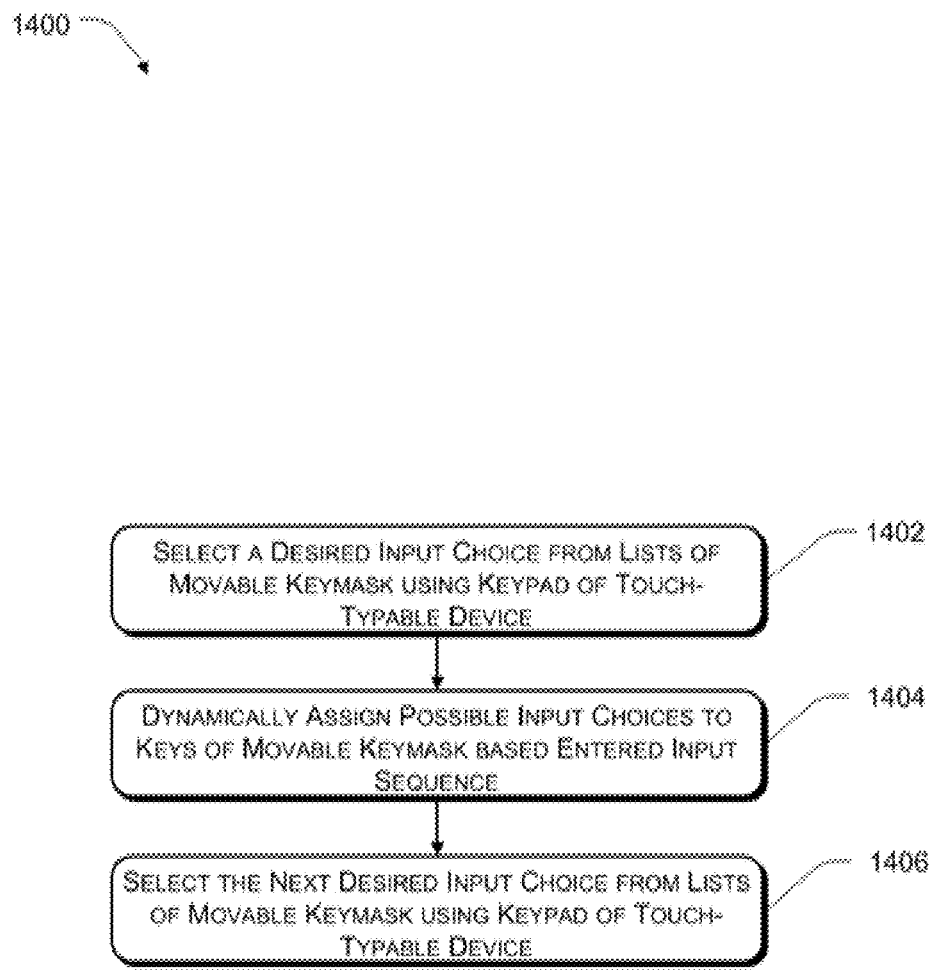
FIG. 14 illustrates an exemplary method for entering textual input using an unambiguous keypad typing scheme.

FIG. 14 illustrates an exemplary method 1400 for entering textual input using an unambiguous keypad typing scheme. At block 1402, a user selects a desired alphabet and/or input choice using a movable keymask and a text input keypad of a touch-typable device. In an embodiment, keys and/or cells of the movable keymask correspond to the text input keypad layout of the touch-typable device. The user can select the desired input choices by pressing one or more keys on the text input keypad that correspond to the keys to which the input choices are assigned on the movable keypad.

At block 1404, a new set of likely and valid input choices are identified by the system based on phoneme and syllabary patterns and/or statistical correlation between previous input sequence and possible set of input choices. The identified input choices are dynamically assigned to keys of the movable keymask based on one or more criteria such as likelihood of occurrence, persistence, consistency with legacy keypad, nearness to last key used, hand in which the device is held, or other ergonomic considerations.

At block 1406, the user can, after the dynamic key assignment, select the desired input choice from the movable keymask using the text input keypad of the touch-typable device. In case the desired input choice is not present in the movable keymask, the subsequent likely list of input choices can be accessed for input choice selection.

Figure 15:
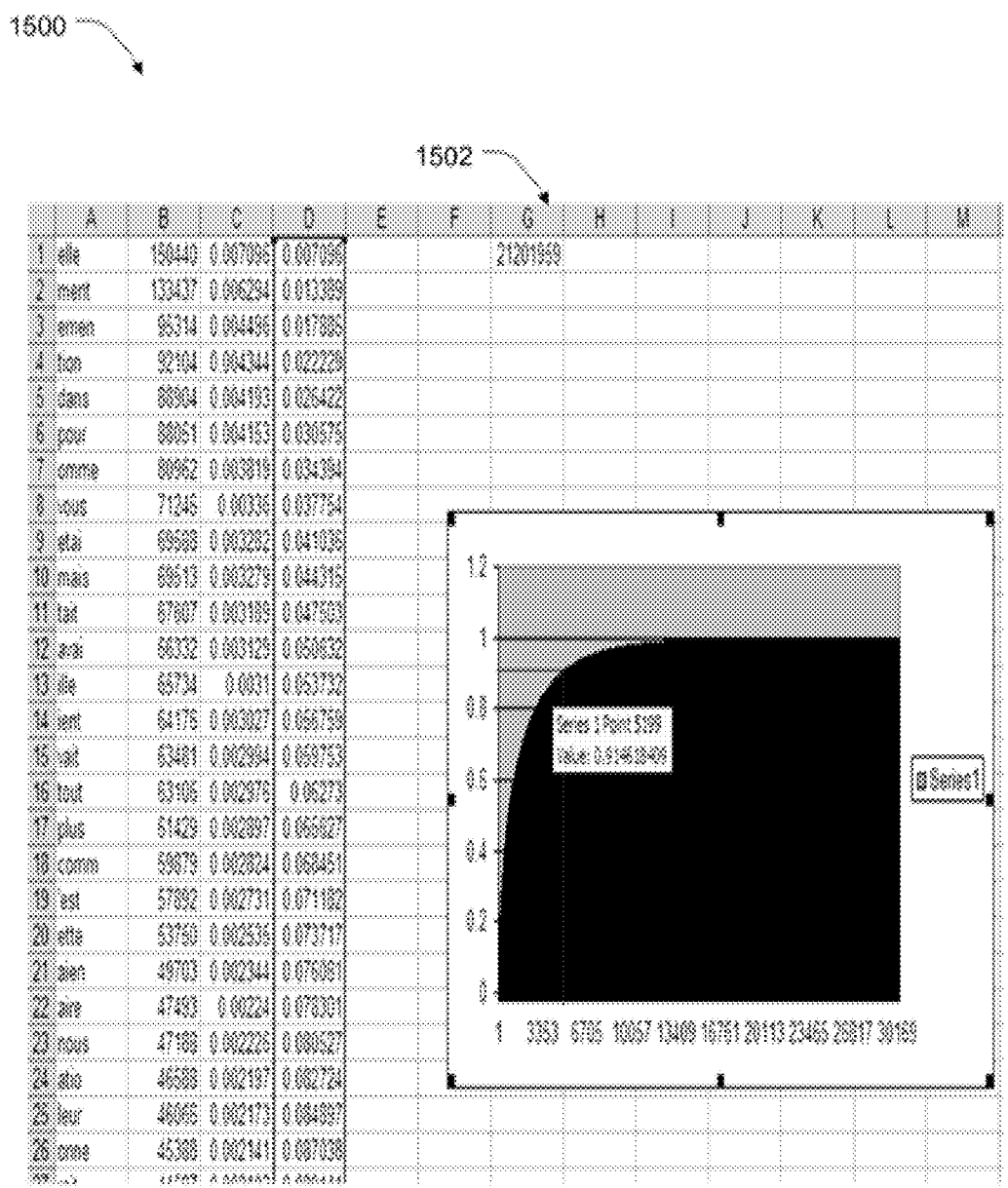
FIG. 15 illustrates alternate embodiments demonstrating ergonomic statistics and predictions made for likely and valid input choices.

FIG. 15 illustrates alternate embodiments 1500 demonstrating ergonomic statistics and predictions made for likely and valid input choices.

FIG. 15 demonstrates a French corpus 1502 indicating that, of the possible over half a million four letter combinations of the alphabet, only about 30,000 unique four letter combinations did occur in the corpus more than once (about 21 million times), just the most frequent 5199 or just 17% of them make up over 90% of all occurrences of four letter sequences in the text. (Or just 1% of all possible four letter combinations making up over 90% of all occurrences in the text) The combination "elle" alone occurred 150,000 times. Most languages show a plot similar to this which results in effectively accurate statistical predictions.

Figure 16:
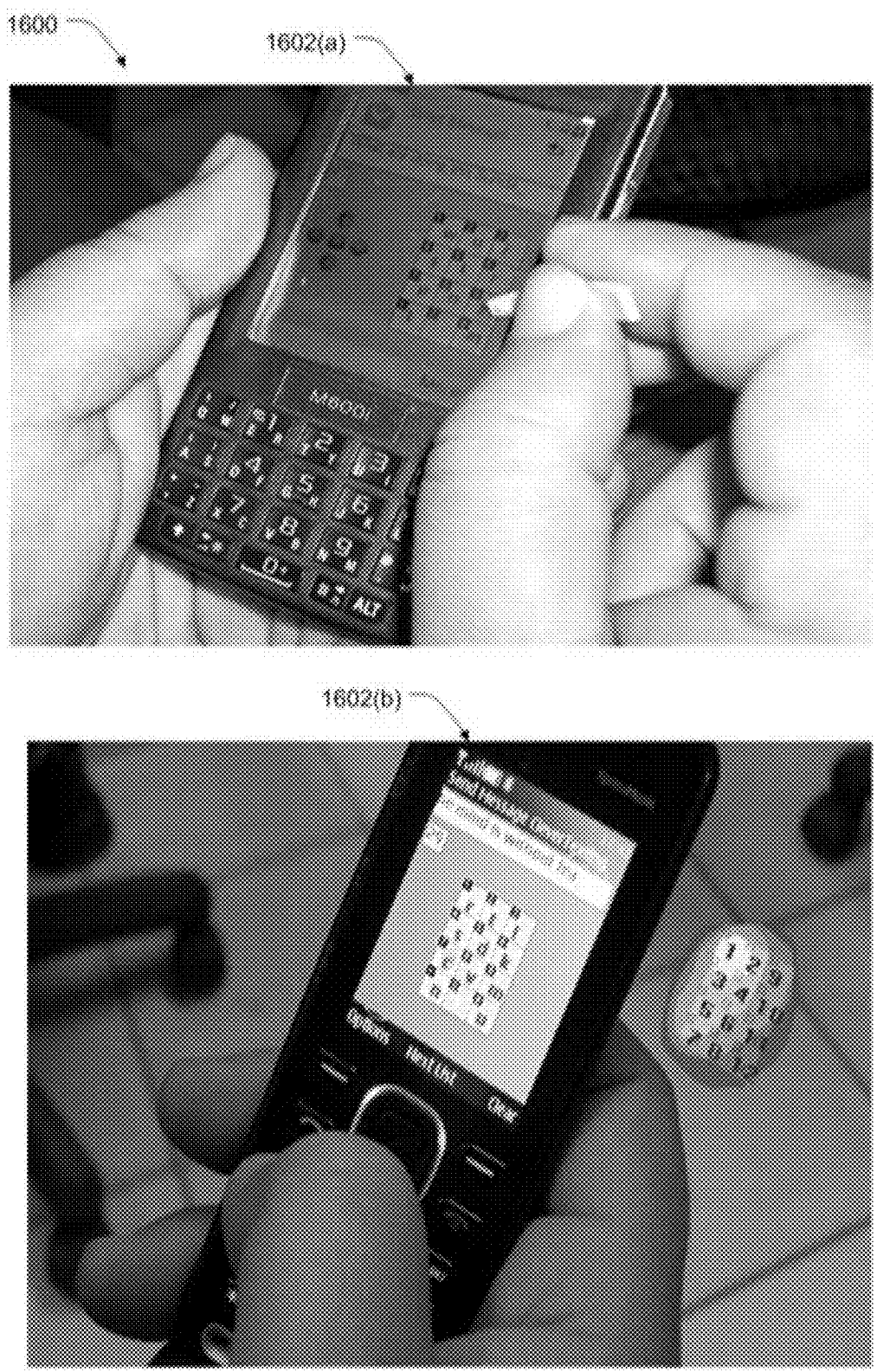
FIG. 16 illustrates alternate embodiments demonstrating ergonomic positioning made for likely and valid input choices.

FIG. 16 illustrates alternate embodiments demonstrating ergonomic positioning made for likely and valid input choices. FIG. 16 demonstrates prediction of the most likely characters following what has been entered by a user and placing them into positions easiest to reach for the thumb of the user (See comfort contours and ergonomic ranks of keys on the keypad shown on the right in 1602(b)). In an embodiment, the arrangements would change automatically when held in the left hand. In yet another embodiment, the likely and valid input choices can be positioned based on the nearest key mode, wherein the most likely and valid input choices are placed near to the last key used (as illustrated in 1602(a)). In another embodiment, the most likely and valid input choice can be positioned so as to keep coming on the same spot as the last used key. More details on the positioning and ergonomic prediction of the likely and valid input choice by the Applicant can be seen at http://www.clevertexting.com/downloads/ErgonomistMar09p89.pdf, describing the Thumbs up to a new way of Texting, Ergonomist Society, UK, March 2009 and at http://www.clevertexting.com/downloads/CleverTexting&PaniniKeypad.pdf.

CONCLUSION

Although the invention has been described in a language specific to structural features and/or methodological acts for entering text input using an unambiguous keypad typing scheme, it is to be understood that the invention is not necessarily limited to the specific features or acts described. Rather, the specific features and acts are disclosed as exemplary forms of implementing the invention.

ADVANTAGES OF THE INVENTION

The invention allows an efficient system and method for entering input choices through touch-typable devices giving a smoother and seamless typing experience.

The invention allows removal of ambiguity while typing with existing text input keypads.

The invention allows dynamic key assignment to provide most likely input choices based on ergonomic considerations.

The invention allows an effective system and method for entering textual input choices through minimal number of key presses.

The invention allows an effective system and method for entering textual input choices that saves user time.

The invention allows a system and method that allows characters and input choices to be input interchangeably in multiple languages.

The invention claimed is:

1. A touch-typable device for accepting desired textual input from a user comprising:
   said touch-typable device including a display;
   a movable keymask comprising of a plurality of dynamically assigned cells that are logically mapped to and activate with one or more keys of a text input keypad of said touch-typable device, wherein each of said plurality of dynamically assigned cells of said movable keymask superimposes over corresponds to textual input choices enabling said user to select said desired textual input choices through said plurality of cells of said movable keymask using said text input keypad of said touch-typable device, wherein said textual input choices are chosen after every user input from a set of likely and valid textual input choices, wherein said likely and valid input choices are selected based on one or a combination of previous textual input sequence, phoneme and syllabary patterns, statistical correlation between said previous textual input sequence and set of textual input choices, dictionary lookups, and usage patterns of said user.

2. The touch-typable device as claimed in claim 1, wherein said movable keymask is positioned on display of said touch-typable device, and wherein said movable keymask is replica of a portion of said text input keypad of the touch-typable device.

3. The touch-typable device as claimed in claim 1, wherein said touch-typable device includes said display that is a touch-screen, and wherein said desired textual input choices are directly accessible through and dynamically assignable to said plurality of touch-screen enabled cells of said movable keymask.

4. The touch-typable device as claimed in claim 3, wherein said user accesses a second set of said textual input choices on said movable keymask from said set of likely and valid input choices using said text input keypad of said touch-typable device in case said desired textual input is not present in said textual input choices.

5. The touch-typable device as claimed in claim 3, wherein said textual input choices chosen from said set of likely and valid input choices are superimposed on said movable keymask based on one or more of physical access of said user to said plurality of cells of said movable keymask, persistence of said textual input choice on said movable keymask, assignment of most likely textual input choices on previously accessed cell, layout of said textual input choices on said text input keypad of said touch-typable device, and nearness to last key used.

6. The touch-typable device as claimed in claim 1, wherein said movable keymask is superimposed over a character map comprising of said textual input choices, further wherein each of said plurality of cells of said movable keymask superimposes over a textual input choice of said character map.

7. The touch-typable device as claimed in claim 6, wherein said movable keymask is navigated over the said character map to access said textual input choices using said touch-typable device.

8. The touch-typable device as claimed in claim 1, wherein said movable keymask is adjacent to a character map comprising of said textual input choices, further wherein said textual input choices displayed in said movable keymask are dynamically changed based on said desired textual input selected and/or highlighted by said user in said character map.

9. The touch-typable device as claimed in claim 1, wherein said desired textual input is compressed based on statistical correlation between previously entered textual inputs.

10. The touch-typable device as claimed in claim 1, wherein said textual input choices support one or more languages and are positioned to enable language convertibility.

11. The touch-typable device as claimed in claim 1, wherein said textual input choices comprise of one or more of alphabets, words, multilingual character sets, symbols, mathematical symbols, formulas, and engineering codes.

12. The touch-typable device as claimed in claim 1, wherein said touch-typable device comprises of one or more of mobile phone, personal handyphone system (PHS), car phones, personal digital assistant, surface computer, pocket beepers, ATM's, STB's, touchscreen kiosks, gaming consoles, and remote controls for display devices such as televisions.

13. A method for accepting desired textual input from a user through a touch-typable device comprising:
generating a movable keymask comprising of a plurality of dynamically assigned cells, wherein said movable keymask is presented on display part of said touch-typable device mapped with one or more keys of text input keypad of said touch typable device,
superimposing said plurality of dynamically assigned cells of said movable keymask over textual input choices; and
receiving an input through at least one of said plurality of dynamically assigned cells of said movable keymask to select at least one of said textual input choices; and
dynamically changing said textual input choices mapped to said plurality of dynamically assigned cells based on said at least one of said textual input choices, wherein said textual input choices are chosen after every user input from a set of likely and valid textual input choices, wherein said likely and valid input choices are selected based on one or a combination of previous textual input sequence, phoneme and syllabary patterns, statistical correlation between said previous textual input sequence and set of textual input choices, dictionary lookups, and usage patterns of said user.

14. The method of claim 13, wherein said movable keymask is configured to be partially or completely displayed on display of said touch-typable device.

15. The method of claim 13, further comprising allowing said user to select said desired textual input from a second set of textual input choices based on whether said desired textual input is present and displayed through said plurality of dynamically assigned cells of said movable keymask, wherein if said desired textual input is not present and displayed through said plurality of dynamically assigned cells of said movable keymask, said second set of textual input choices are displayed through said plurality of dynamically assigned cells of said movable keymask using said touch-typable device.

16. The method of claim 13, wherein said textual input choices are chosen using a text input keypad of said touch-typable device, wherein said plurality of dynamically assigned cells are mapped with one or more keys of said text input keypad.

17. The touch typable device as claimed in method of claim 16, wherein said textual input choices chosen from said set of likely and valid input choices are superimposed on said movable keymask based on one or more of physical access of said user to said plurality of dynamically assigned cells of said movable keymask, persistence of said textual input choice on said movable keymask, assignment of most likely textual input choices on previously accessed cell, layout of said textual input choices on said text input keypad of said touch-typable device, and nearness to last key used.

18. The method of claim 13, wherein said movable keymask can be scrolled to enable said user to access said textual input choices.

* * * * *